United States Patent [19]

Minovitch

[11] 4,361,202

[45] Nov. 30, 1982

[54] AUTOMATED ROAD TRANSPORTATION SYSTEM

[76] Inventor: Michael Minovitch, 2832 St. George St., Los Angeles, Calif.

[21] Appl. No.: 48,715

[22] Filed: Jun. 15, 1979

[51] Int. Cl.$^3$ .............................................. B60K 31/00
[52] U.S. Cl. ..................................... 180/168; 104/88; 246/167 D; 340/52 R; 343/7 V M; 364/426
[58] Field of Search ......... 180/168, 167, 169; 273/243; 104/88; 343/7 ED; 318/576, 587; 364/426, 436, 438, 456, 431; 325/117, 116; 340/52 R, 51, 52 F, 53, 40, 23, 38 R

[56] References Cited

U.S. PATENT DOCUMENTS

| | | | |
|---|---|---|---|
| 2,996,137 | 8/1961 | Chu et al. | 340/53 |
| 3,227,096 | 1/1966 | Gorjanc | 104/88 |
| 3,714,625 | 1/1973 | Fayling | 180/167 |
| 3,773,136 | 11/1973 | Palazzetti | 318/587 |
| 3,787,679 | 1/1974 | Birkin et al. | 340/32 |
| 3,805,056 | 4/1974 | Birkin | 340/23 |
| 3,828,307 | 8/1974 | Hungerford | 340/23 |
| 3,899,671 | 8/1975 | Stover | 364/436 |
| 3,948,342 | 4/1976 | Pircher et al. | 180/168 |
| 3,970,840 | 7/1976 | DeBruine | 250/202 |
| 3,984,807 | 10/1976 | Haemmig | 340/23 |
| 4,040,500 | 8/1977 | Blakeslee | 180/168 |
| 4,069,888 | 1/1978 | Wolters | 180/169 |
| 4,073,359 | 2/1978 | Fujiki et al. | 340/53 |
| 4,184,146 | 1/1980 | Fratzke | 340/52 F |
| 4,215,759 | 8/1980 | Diaz | 180/168 |

FOREIGN PATENT DOCUMENTS 1068145 5/1967 United Kingdom ................ 180/168

OTHER PUBLICATIONS

Popular Science "Dream Highways for Dream Cars", p. 143, May 1956.

*Primary Examiner*—David M. Mitchell
*Attorney, Agent, or Firm*—Christie, Parker & Hale

[57] ABSTRACT

An automated transportation system for vehicular travel along a roadway is presented. The roadway can be any hard surface that contains an embedded metallic guiderail along its center. A proximity transducer (metal detector) installed under the vehicle, senses the metallic guiderail and sends steering commands to the vehicle's steering actuators to keep the vehicle moving in the center of the roadway directly over the guiderail. Transponders are embedded along the guiderail at selected points for automatic roadway identification, position determination and automatic speed, headway and route selection and automatic traffic control. The system also provides automatic branching and lane changing. The vehicle's control system includes sensors, signal processors, a microprocessor and various power actuators that are connected to the vehicle's steering, braking and accelerator systems. An on-board collision avoidance system using sonic or radar detection means is also provided. The vehicle can be programmed to automatically follow a pre-selected route by inserting route instructions into the microprocessor's memory where it can be retrieved and used any number of times. Magnetometer sensors are also embedded along the roadway to detect the presence and speed of all vehicles, thereby allowing ordinary, manually-controlled vehicles to use the same roadways as the automatically controlled vehicles for a mixed traffic flow. The guiderails and transponders can be embedded in essentially all existing streets and highways to provide an economical comprehensive fully automated road transportation system for private and commercial vehicles.

49 Claims, 21 Drawing Figures

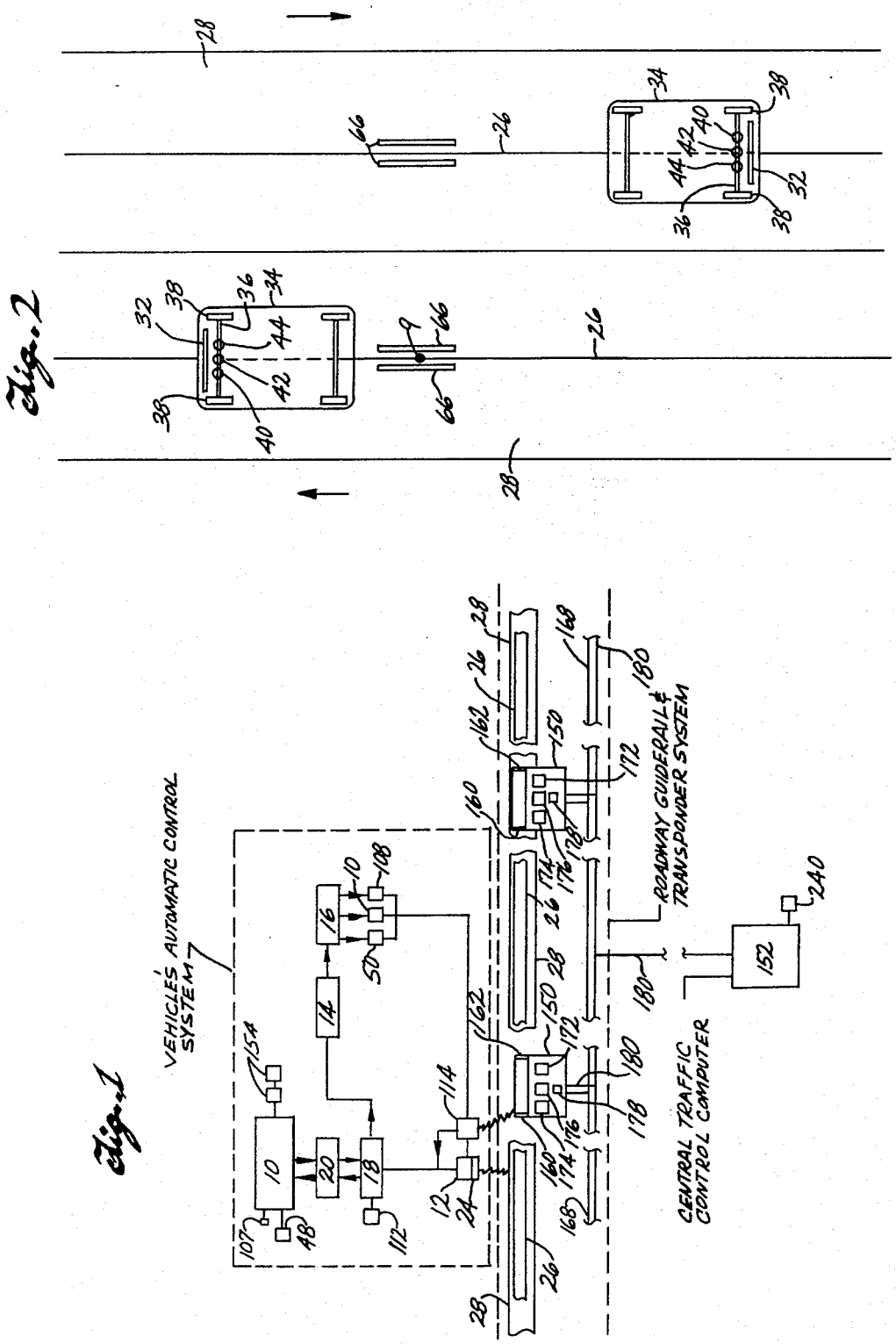

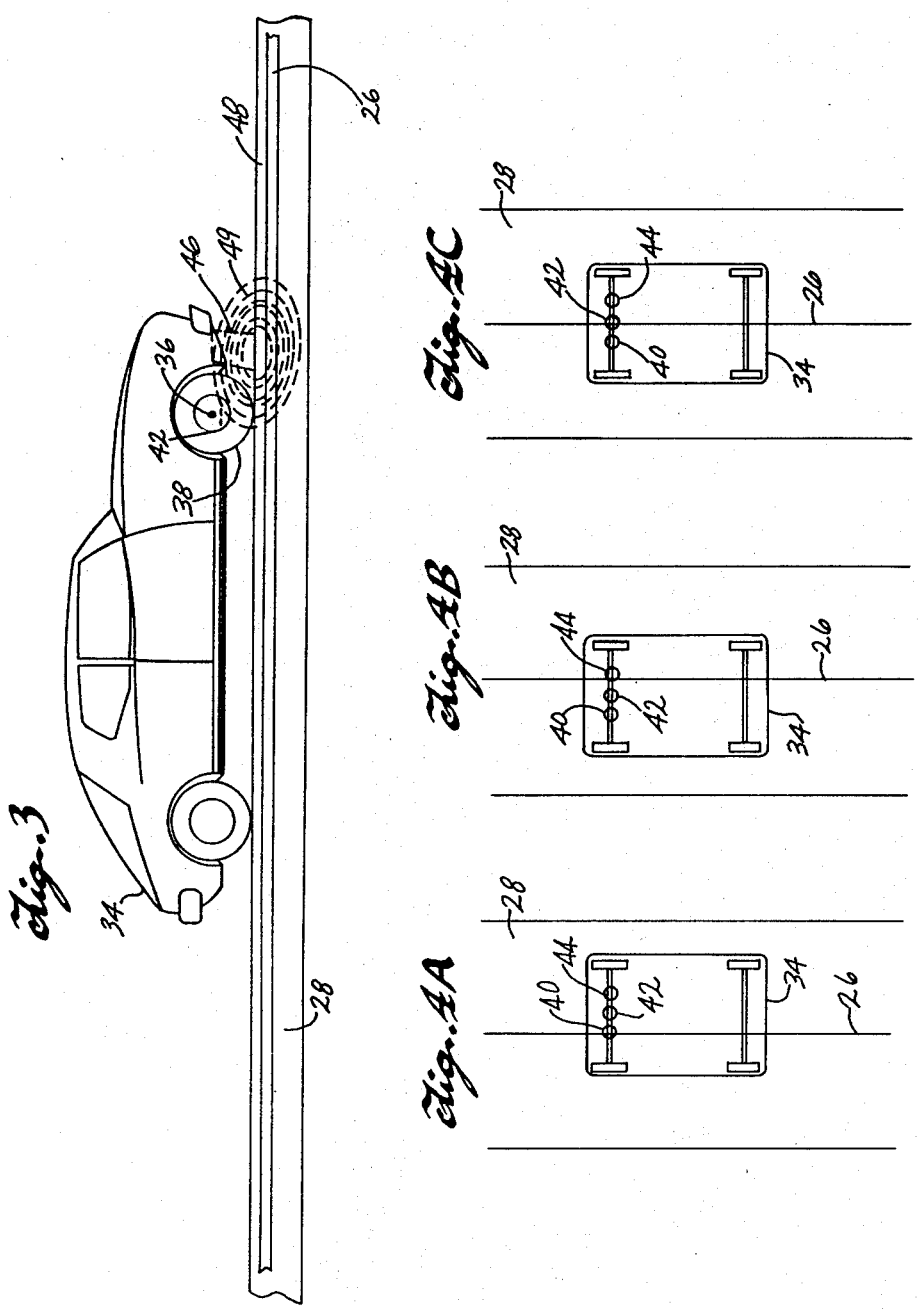

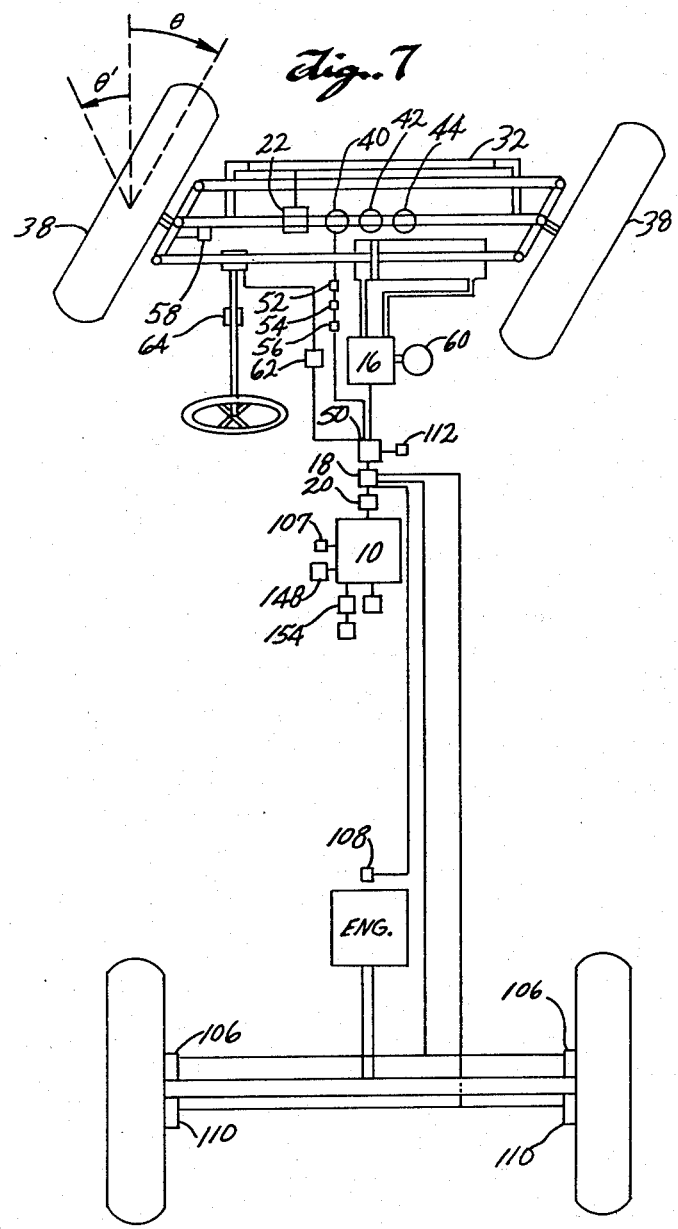
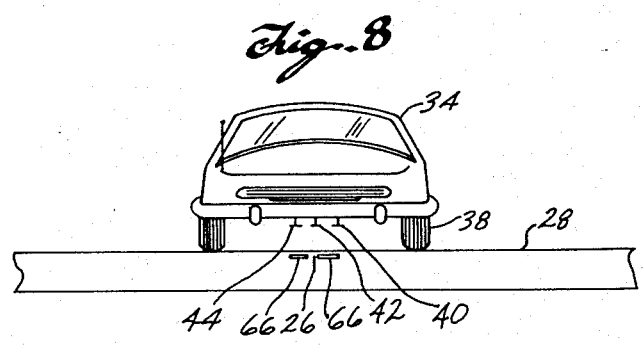

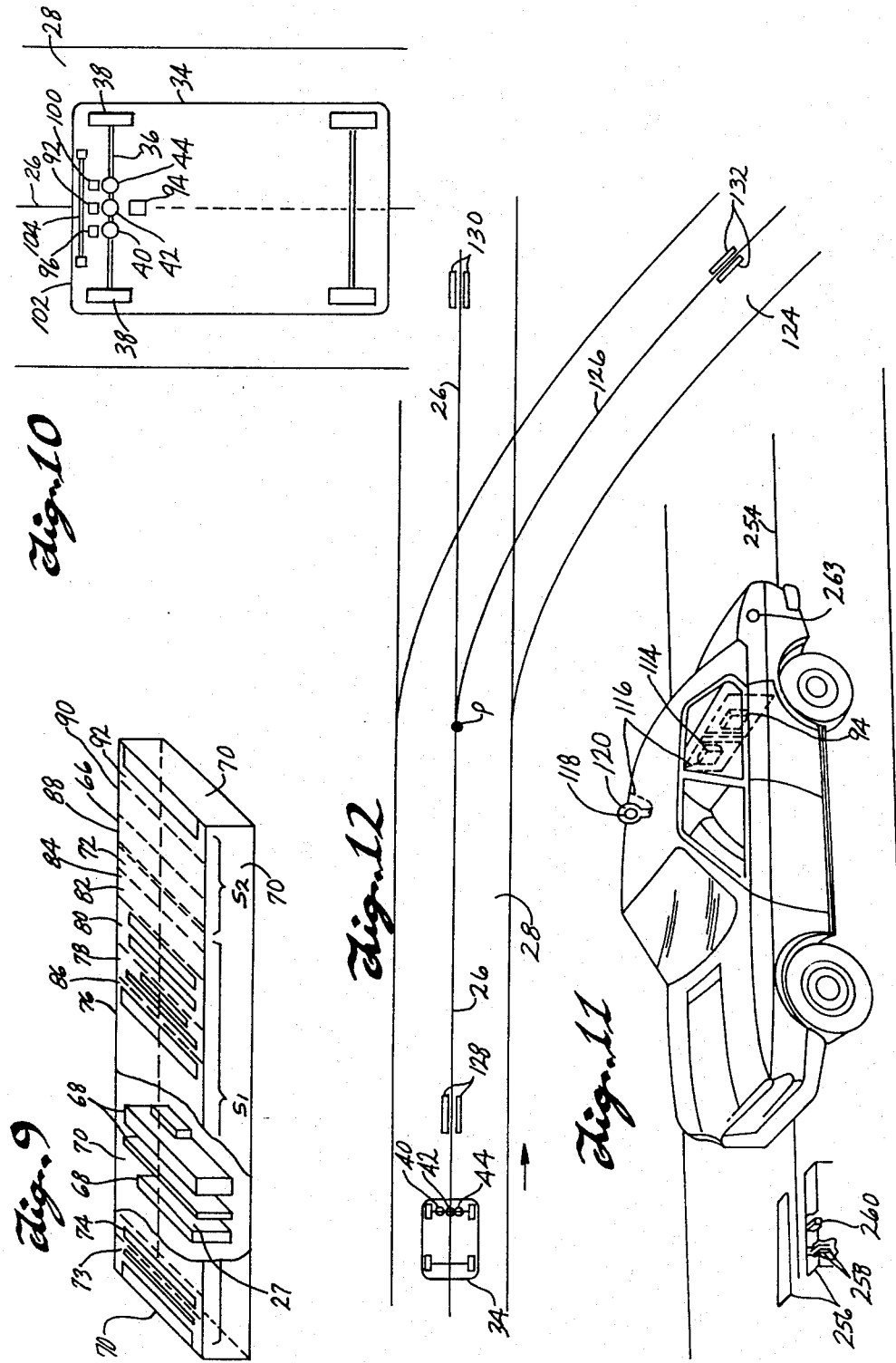

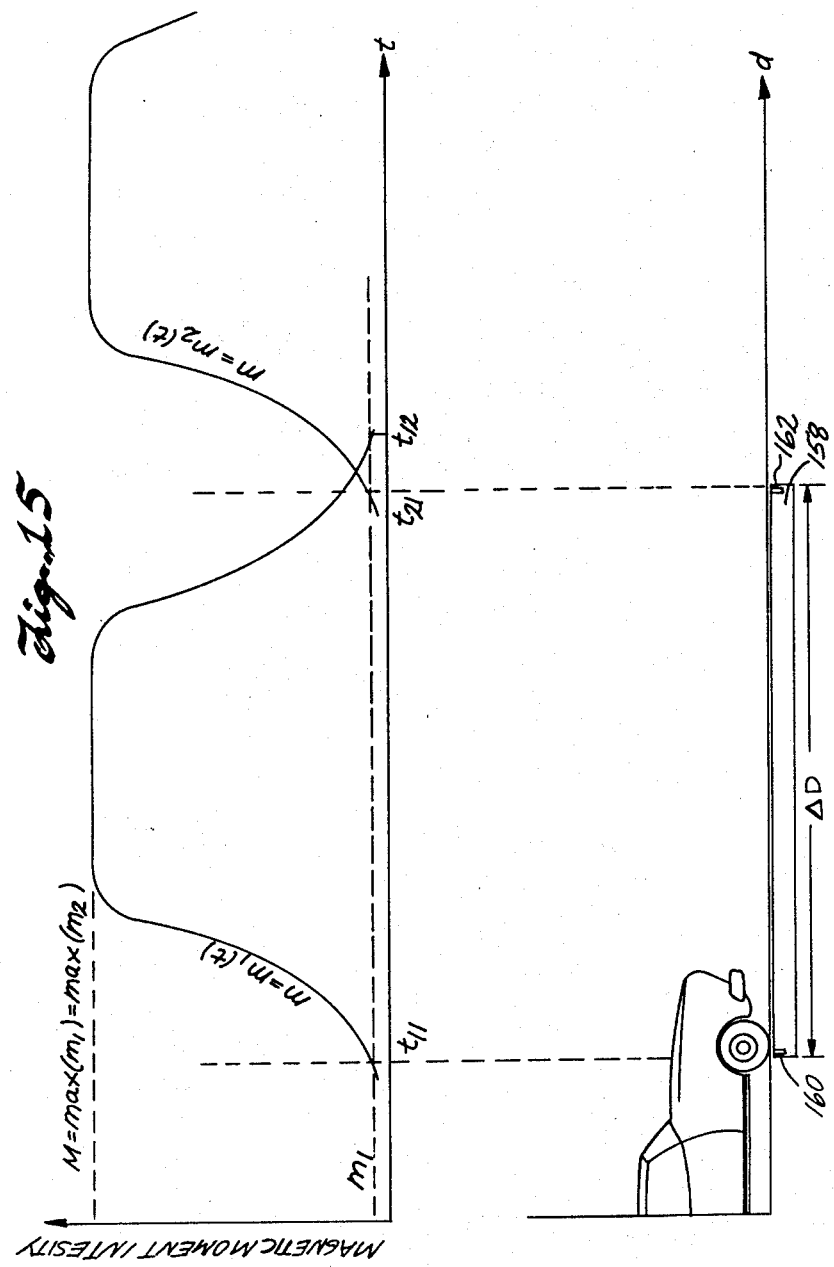

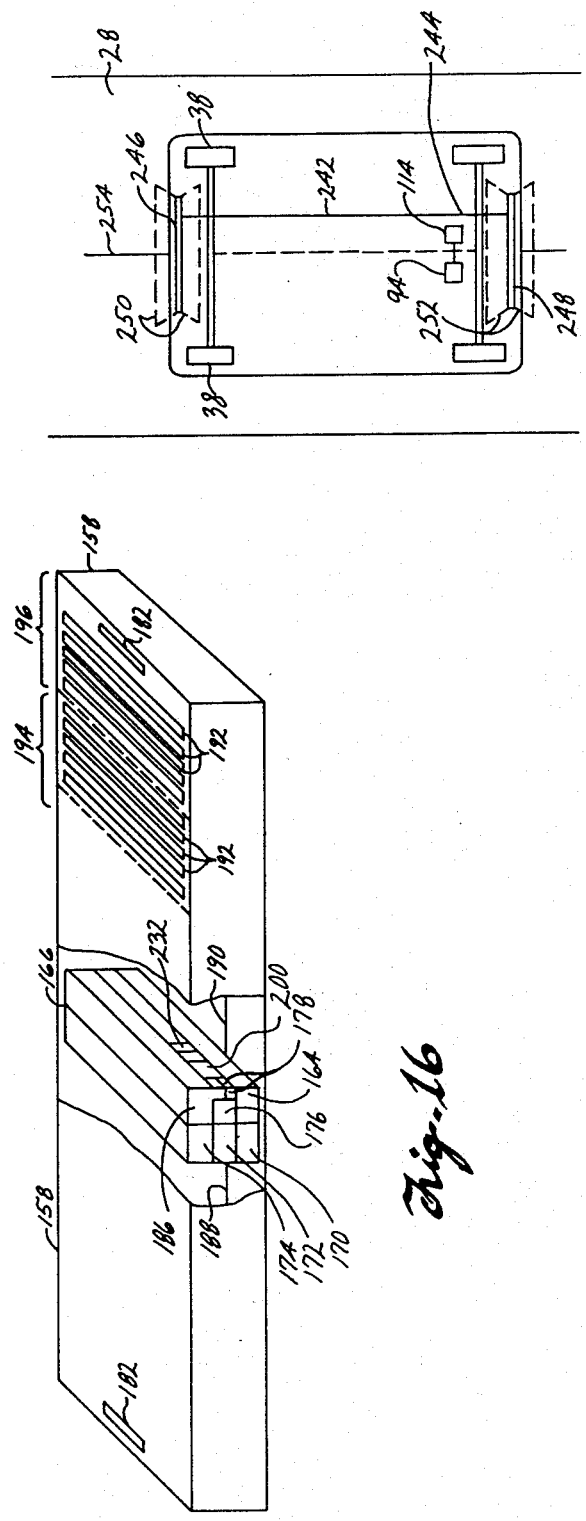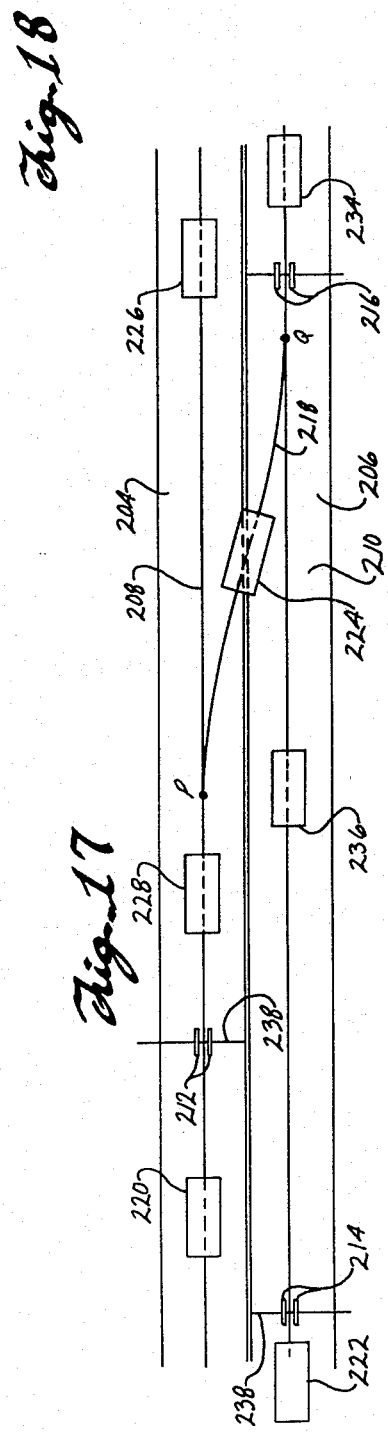

AUTOMATED ROAD TRANSPORTATION SYSTEM

BACKGROUND

The vehicular mode of ground transportation along roadways such as private automobiles, buses, trucks and the like plays a basic role in the societies and economies of all industrialized countries. The easy mobility that the private automobile offers has made it an indispensable tool of modern civilization. Enormous sums of money have been spent to transform early dirt roads into smooth concrete streets and vast super-highway systems. A large sum of money has also been spent for mechanical improvements of the motor vehicle. Although important improvements have been made, such as the self-starter and automatic transmission, the basic manual operation involving steering, accelerating and braking has remained essentially unchanged, since the invention of the automobile itself. On the other hand, the airplane, which was invented after the automobile and which requires a much more complicated control system, improved much more rapidly. For example, the automatic pilot was invented only about twenty-five years after the airplane itself, yet it provided essentially automatic flight control. It has been almost one hundred years since the automobile was invented and there is still no viable automatic guidance system available. The present invention is intended to not only provide an automatic guidance system similar to the automatic pilot, but to extend it well beyond this system to provide an essentially complete automatic driving system.

Specifically, the present invention will provide an economical and safe, all-weather, automatic guidance system for essentially all types of road vehicles that includes: automatic steering, automatic speed and headway control, automatic roadway identification and position determination, automatic lane changing and branching onto connecting roadways, automatic route following and automatic route selection. Although at first glance, this concept may be dismissed as "science-fiction", we shall disclose herein that such a system is within easy reach of being realizable with present state-of-the-art technology.

The prior art does contain concept proposals for vehicular automatic guidance but all these systems are very limiting in that they provide for only automatic steering control. In particular, these prior-art designs are based on having the vehicle follow an electric cable that is embedded in the middle of the roadway and fed with an electric current. In theory, the vehicle is guided over the cable by a closed loop control of the steering mechanism which senses the magnetic field generated by the current in the cable and thereby keeps the vehicle moving directly over it. Unfortunately, the system requires the expenditure of large amounts of electrical energy and a system to provide this electric current. Hence, in addition to being a large consumer of electrical energy, this system is also vulnerable to instantaneous and complete failure which would result from a single short circuit. This potential for failure would increase during bad weather conditions when the result of such failure would be most hazardous. Furthermore, no provision is made for automatic speed or headway control or for automatic lane changing or branching and the prior art appears completely devoide of these important considerations. Finally, the large scale installation of the current carrying cables would be very costly. For a detailed description of this prior art system see "An Automatic Guidance System for Road Vehicles," *IEE International Conference on Automobile Electronics,* 6–9 July, pp. 140–143 by R. Bosch, and U.S. Pat. No. 3,482,644 entitled "Steering Control System For Unmanned Vehicles," by H. B. Krieger and K. A. Wilson.

The prior-art also contains an automatically guided material mover for operation inside office buildings or on the floors of large manufacturing plants. This automated vehicle moves along a selected path by following an invisible ultraviolet fluorescent strip that has been "painted" directly onto the floor's surface. The ultraviolet fluorescent path is visible only under "black light." The vehicle is equipped with an ultraviolet lamp that is mounted under it which stimulates the guide strip to fluoresce and emit visible light. Photoelectric sensors that are also mounted under the vehicle, pick up the stimulated fluorescent path. These sensors, along with electrical control circuity, automatically guide the vehicle along the path by a steering motor. The operating details of this vehicle are disclosed in U.S. Pat. No. 3,935,922 entitled "Vehicle Guidance Mechanism." Although this system does use a non-powered, passive guidestrip, it is even more vulnerable to failure during out-door operations than the former system using the electrified cables. For example, accumulated dirt or litter that are unavoidable on outdoor roadways, would cut off the vehicle's ultraviolet radiation and thus render the vehicle's photoelectric sensors completely useless. In addition, the painted fluorescent guidestrip would be subject to constant errosion due to weathering. Thus, in this system all of the roadways would have to be constantly cleaned and freshly painted—which would be impractical.

The automatic guidance system introduced herein is based upon utilizing a passive, low-cost, metallic guiderail embedded longitudinally along the centers of ordinary concrete roadways that is immune to all weather conditions, is unaffected by dirt, litter or water, requires no expenditure of energy and which is essentially maintenance-free. A proximity transducer or metal detector is installed under the vehicle that senses the metallic guiderail and sends steering commands to the vehicle's steering actuators to keep it moving along a path directly over the guiderail. The rail sections do not have to be attached to each other and they could be easily laid into pre-cut grooves or slots by high speed, automated methods that could approach the speed and simplicity inherent in the painting of lane dividers. The disturbance to the roadway surface would be minimal and essentially invisible. Thus, ordinary vehicles without the guidance system could be driven over guiderail equipped roadways or non-guiderail equipped roadways without any noticeable change whatsoever. The economics are such that all existing streets and highways of large and small cities can eventually be equipped with the guiderails at relatively little cost. The total installation cost, for example, would be comparable to that expended for electric street lighting. The cost could be more than offset by the fuel savings resulting from a more efficient traffic flow and the savings arising from fewer accidents. By adding a relatively inexpensive system of transponders that are also embedded in the roadway at various points along the guiderail and wiring them to a central traffic control computer, the system is expanded to provide not only automatic steering but automatic speed and headway control, automatic position determination, automatic route selection and optimal traffic flow.

SUMMARY OF THE INVENTION

Thus, in the practice of this invention according to a presently preferred embodiment typically comprising a roadway with an embedded metallic guiderail extending longitudinally along the center of each lane and a vehicle moving over the roadway equipped with a proximity transducer (i.e. metal detector) that is installed under the vehicle which senses the metallic guiderail, thereby sending steering commands to the vehicle's steering actuators that keep the vehicle moving along the center of its lane of travel directly over the guiderail.

Passive transponders are also embedded at various points along the guiderail (such as before sharp curves) that are scanned by the vehicle's on-board sensors for automatic speed control. Passive transponders are also embedded at various points along the guiderail for automatic position determination and automatic roadway identification. Active transponders are used to provide automatic collision-free lane changing and branching onto various connecting roadways. An on-board collision avoidance system using sonic or radar detection means is also provided. Magnetometers are embedded along the roadway to detect the presence, location and speed of all vehicles whether they are automatically controlled or not. This enables the system to monitor the flow of all traffic and allow the possibility of mixing ordinary, manually controlled traffic with automatically controlled traffic along the same guiderail equipped roadway.

The vehicle's control system includes proximity transducers, sensors, signal processors, a microprocessor, various servo amplifiers and power actuators that are connected to the vehicle's steering, braking and accelerator systems in closed loop configurations. All branch points leading to connecting roadways are identified by active transponders that are embedded into the roadway along the guiderail just before the branch point. Sensors on board the vehicle communicate with the transponders by picking up position information, speed commands, roadway or branch identification information and traffic control information which is instantly passed into the vehicle's on-board microprocessor. The vehicle can be programmed to automatically follow any desired path through any complex network of branches leading to various connecting roadways by simply inputing the desired route selection into the microprocessor's memory. An automatic, collision-free, switching subsystem is provided to enable the vehicle to automatically follow the desired route.

The metallic guiderails are embedded into existing roadways by first cutting a narrow groove or slot into the concrete surface, longitudinally along the middle of each lane. This is allowed by inserting the guiderail sections (that are flat and several meters long) edgewise into the slots, end to end. Small gaps are left between adjacent sections for expansion. They are permanently fixed in place by a thin layer of cement or epoxy. Since the guiderails consume no energy and can be mass produced and installed very cheaply, all of the streets, highways and expressways of a large city as well as rural roadways, can be equipped with the guiderails at relatively little cost and with minimum disruption. The system is based upon utilizing passive metallic guiderails, low cost proximity transducers, transponders, magnetometers and microprocessors as opposed to onboard radar systems or active guiderails that are inherently complex, expensive and prone to operational failure.

The vehicles would also be dual control in that they could be easily and quickly switched from the automatic mode to manual control and vice versa. For early application, the guidance system would be a relatively small, self-contained unit that could be installed on ordinary, manually-controlled vehicles as a "luxury" item (that could also be "factory installed" when the vehicle is manufactured). Eventually, the system could become standard equipment that is a necessary and essential part of every new vehicle manufactured including trucks, busses and private automobiles of all types and models. Mass production techniques would allow the cost to be comparable to that of the combined cost of, for example, power brakes, power steering, air-conditioning and radio/stereotape systems of ordinary automobiles. The result would be a totally automated ground transportation system for all roadway vehicles that would include automatic steering, automatic speed control, automatic lane charging, automatic branching onto connecting roadways, automatic route following and automatic route selection. During peek traffic conditions in high population density areas, the system will provide automatic route selection and automatic speed/headway control so as to produce an overall optimal traffic flow that would result in overall minimum travel time and maximum fuel economy. The system will transform the basic mode of vehicular transportation along ordinary roadways and highways from one that requires human or manual control—that is inherently accident-prone to the extent of causing an annual U.S. loss of 50,000 lives at an annual cost of $37,000,000,000—into a completely automated transportation system that is essentially accident-free. The system would allow the inter-city freeway or throughway super highway systems, constructed during the past thirty years at a cost of hundreds of billions of dollars—that have been rendered almost useless every day during peek traffic periods—to once again become the arteries for fast moving vehicular transportation at all hours and allow them to keep operating at maximum efficiency twenty-four hours per day.

Finally, the time spent driving behind the wheel of conventional vehicles could be recovered and utilized productively in the automated system, for rest and relaxation (e.g. taking a nap), watching a favorite TV program (with an on-board television system), reading a newspaper, magazine or book, making telephone calls (via an on-board communications system), writing letters or even by continuing office work such as writing reports or the like. The frustration and strain of driving (especially through heavy traffic) would be completely eliminated while at the same time, reducing the chance of an accident to almost zero. (Low power, low voltage, compact solid state electronic systems are essentially failure proof and, for added safety, each component would be designed with built-in redundancy and back-up subsystems).

Thus, the automatic guidance system described herein can have a revolutionary and far-reaching beneficial effect on basic lifestyles that has itself become so dependent on the conventional automobile.

DRAWINGS

These and other features and advantages of the present invention will be appreciated as the same becomes understood by reference to the following detailed description of a presently preferred embodiment when considered in connection with the accompanying drawings wherein:

FIG. 1 illustrates a schematic block diagram of a vehicle's automatic control system including a schematic block diagram of a portion of automated roadway and remote central traffic control computer;

FIG. 2 illustrates a horizontal projection of two automatically controlled vehicles moving in opposite directions over a guiderail equipped roadway with various electronic guidance and control sensors shown schematically;

FIG. 3 illustrates a vertical longitudinal cross-section of a vehicle moving over a concrete roadway with an embedded guiderail showing the operation of the vehicle's proximity transducer and the reaction field it generates in the guiderail;

FIGS. 4A, 4B and 4C illustrate a vehicle moving too far to the right of, too far to the left of and a vehicle moving on-course, directly over a guiderail respectively;

Figure 6:
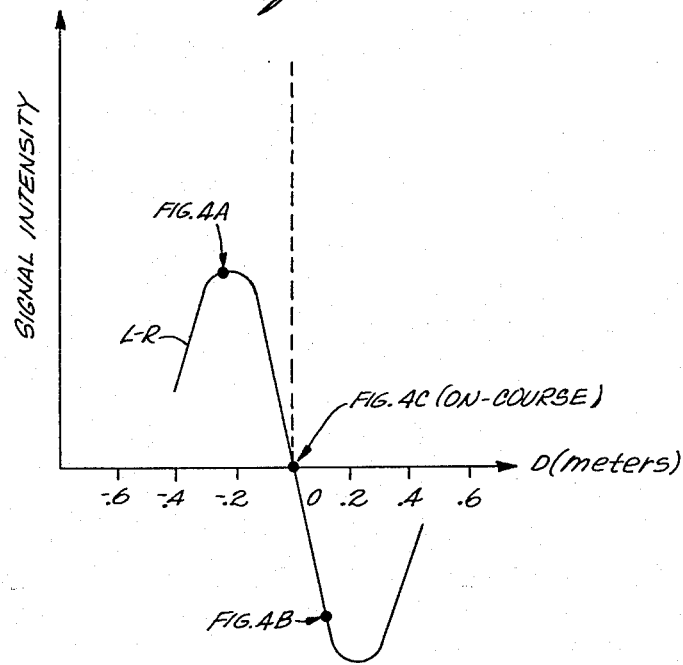
Figure 13:
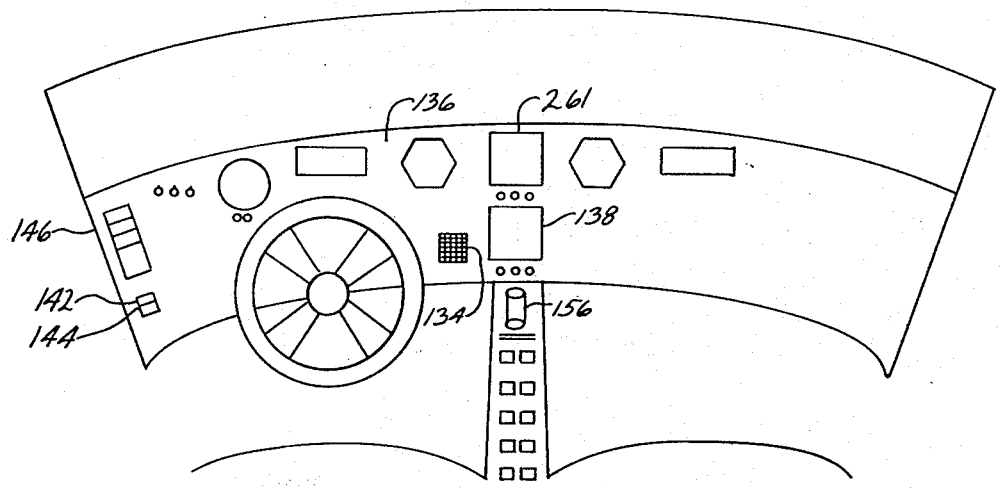
Figure 14:
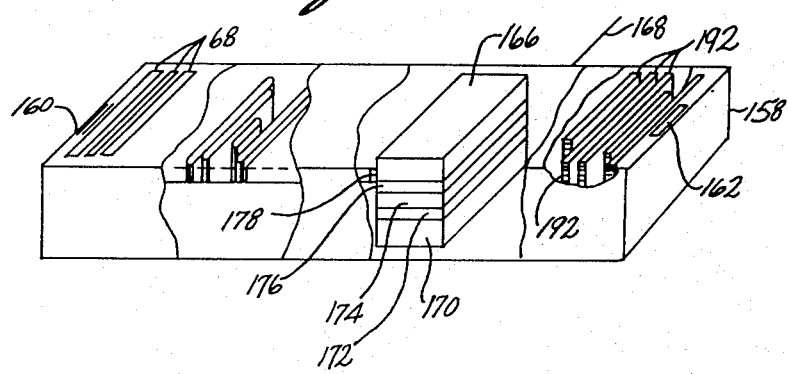
Figure 19:
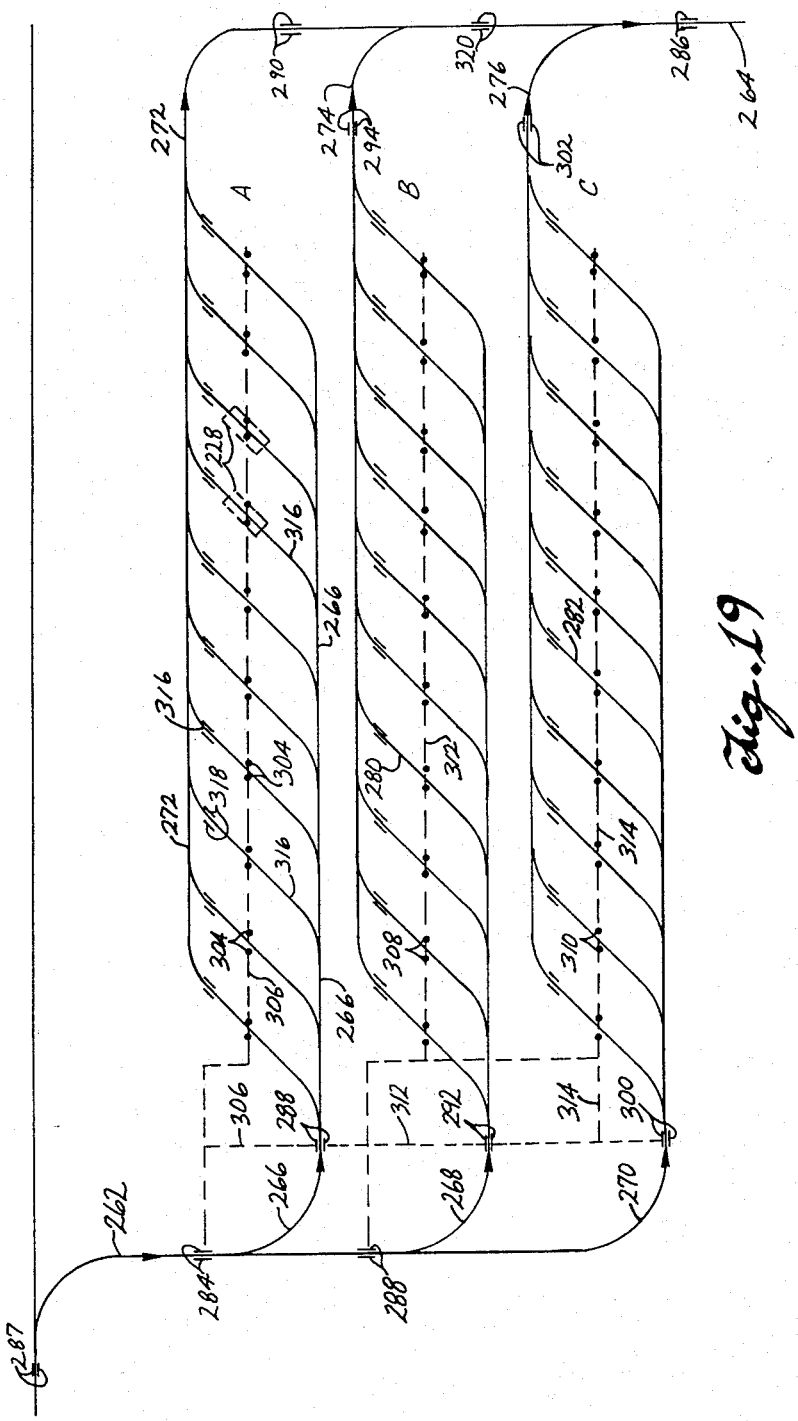

FIG. 6 illustrates the composite signal strength profile generated by subtracting the amplitude of the signal picked up by the right hand sensor from that picked up by the left hand sensor as a function of the vehicle's lateral displacement over the guiderail and including representative examples of the values of this composite primary steering signal when the vehicle is moving too far to the right (FIG. 4A), too far to the left (FIG. 4B) and when the vehicle is moving on-course directly over the guiderail (FIG. 4C) respectively;

FIG. 7 is a schematic diagram illustrating the vehicle's automatic steering and control system;

FIG. 8 illustrates a vertical transverse view of an automatically controlled vehicle moving over a guiderail equipped roadway and a pair of control transponders;

FIG. 9 is a cut-away, three-dimensional perspective view of a typical passive control transponder illustrating its interior construction;

FIG. 10 is a horizontal projection of an automatically controlled vehicle illustrating alternative guiderail locator methods for automatic steering and control using an independent RF proximity transducer and an independent radio transmitter for generating reflected guiderail locator signals with corresponding pick-up receivers;

FIG. 11 illustrates an automatically controlled vehicle equipped with a collision avoidance radar antenna mounted on top of the vehicle's roof for 360° coverage and including a view of a control transponder embedded into the roadway and an embedded guiderail;

FIG. 12 illustrates a guiderail equipped roadway with a guiderail equipped branching roadway together with a pair of branching identification and control transponders;

FIG. 13 illustrates a typical control panel inside an automatically controlled vehicle including a microprocessor video monitor, mobile television and radio-telephone communication systems and radar monitoring screen;

FIG. 14 is a cut-away, three-dimensional perspective view of an active control transponder with a variable speed profile command signal generator and two vehicle sensing magnetometers;

FIG. 15 illustrates a vehicle in the process of passing over a control transponder equipped with two vehicle sensing magnetometers and also illustrating the magnetic moment signal strength profiles generated by these magnetometers as a function of time that is also correlated to the distance of the vehicle's front bumper as it moves across the transponder;

FIG. 16 is a cut-away, three-dimensional perspective view of an active control transponder with independent primary and secondary variable speed profile command signal generators equipped with two vertical propagating, low power radar antennas for vehicle sensing;

FIG. 17 illustrates a two-lane guiderail equipped roadway for moving automated vehicles in the same direction together with a lane changing guiderail and various control transponders for automatic lane changing;

FIG. 18 is a horizontal projection of an automatically controlled vehicle illustrating an alternative vehicle control system based on reflected radio signal reception; and FIG. 19 illustrates an automated parking lot wherein automatically controlled vehicles can enter and park without requiring human assistance.

DESCRIPTION OF THE PREFERRED EMBODIMENT

The basic and most important technical development upon which this invention is based is the small, compact microprocessor. This "computer-on-a-chip" device has very low cost, operates with almost zero power consumption and is able to process large amounts of complicated data, or incoming information from various sensors, essentially instantaneously and without error. Thus, in one sense, the automatically guided and controlled vehicle in the present invention can be viewed as the result of replacing the driver's brain, in a conventionally operated road vehicle by a programmable microprocessor 10, the driver's eyes, ears and nose with various sensors 12, the limbs with various control actuators 14, and servo-amplifiers 16, and interfacing (or connecting) these subsystems to the microprocessor 10, via a central signal processor 18 and a central analog-to-digital converter 20 in a closed loop configuration as shown schematically by the block diagram of FIG. 1.

The vehicle's lateral guidance sensor 22, used for automatic steering, is comprised of a high accuracy proximity transducer 24 of the radio-frequency (RF) type which senses a passive steel guiderail 26 that is embedded just beneath the surface and along the center of a concrete roadway 28. The proximity transducer 24 has two basic components; a transmitter 30, whose antenna 32, is located under the vehicle 34, a short distance ahead of the front wheel axle 36 and equidistant from the front wheels 38, and a system of three identical pick-up search coils 40, 42 and 44 that are located just below and along the front wheel axle 36. The RF transmitting antenna 32 transmits a broad, wedge-shaped beam 46 downward and slightly rearward so that when it strikes the concrete roadway 28, the beam 46 is about ½ meters thick and 2 meters wide. (The above elements are illustrated in FIGS. 2 and 3.) The beam 46 penetrates the thin layer of concrete or epoxy 48, over the guiderail 26, and induces eddy currents in the guiderail 26. These eddy currents, in turn, generate week, oscillating magnetic fields 49, similar to that produced by a straight wire carrying an alternating electric current. The three search coils 40, 42 and 44 pick up this oscillating magnetic field which is amplified many fold (for increased sensitivity) and transformed into strong guiderail locator signals.

The search coils 40, 42 and 44 are arranged so that when the vehicle 34 is moving directly over the guiderail 26, the middle coil 42 is centered directly over it. One coil 40, is on the left side of the guiderail 26 and the other coil 44 is on the right side and equidistant from it as shown in FIG. 2. All three search coils are spaced apart along a line just below and parallel to the vehicle's front wheel axle 36 (perpendicular to the guiderail) and in a plane parallel to the roadway's tangent plane directly under the vehicle's front wheels 38.

The two meter wide beam width of the RF proximity transducer allows the vehicle to "sweep over" the roadway with a broad beam which will irradiate the passive guiderail and thereby cause it to generate the guiding magnatic reaction field that the vehicle needs to locate and follow even when it is moving as much as one meter on either side of the on-course path directly over it.

Let L, C and R denote the amplitude profiles of the guiderail locator signals picked up by the left hand search coil 40, center search coil 42, and the right hand search coil 44 respectively. These amplitude profiles of the guiderail locator signals can be viewed as graphs of signal intensity (amplitude) plotted against the vehicle's lateral center line displacement from the embedded guiderail 26. Notice that when the vehicle is moving directly over the guiderail, the center search coil 42 is closest to it and will therefore generate the strongest guiderail signal. Notice also that in this case, the left and right hand search coils (40 and 44) will generate locator signals of equal amplitude and identical profile (i.e. identical graphs) because they are identical to each other and symmetrically located on each side of the guiderail 26, and equidistant from it. Hence, the subtracted signal, represented by the amplitude of L minus the amplitude of R completely vanishes. This is expressed by $S = L - R = 0$.

If the vehicle begins to move slightly to the left of the guiderail 26, the amplitude of L begins falling while the amplitude of R begins rising (because the left hand coil 40 moves further away from the guiderail 26 while the right hand coil 44 moves closer to it.) Hence, in this case the subtracted signal $S = L - R$ becomes negative. Conversely, if the vehicle moves too far to the right of the guiderail 26, $L - R$ becomes positive. Of course, in both cases, the amplitude of C decreases. These characteristics are utilized to provide the vehicle's high accuracy, all weather, automated steering system disclosed herein.

Figure 5:
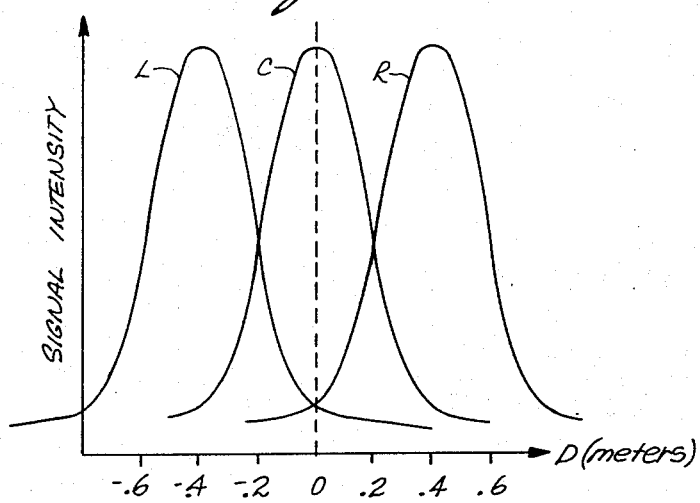
FIG. 5 illustrates the received signal strength profiles that are picked up by the vehicle's left, central and right guiderail locator sensors as a function of the vehicle's longitudinal center line lateral displacement from the embedded guiderail.

FIGS. 4, 5 and 6 are schematic diagrams illustrating the relative signal strength profile characteristics of the guiderail locator signals L, R and C when the vehicle is moving too far to the left (FIG. 4B) too far to the right (FIG. 4A) and when the vehicle is moving on course directly above the guiderail 26 (FIG. 4C) respectively. The corresponding subtracted signal strength $S = L - R$ is shown in FIG. 6. The vehicle's electronic guidance control algorithm, which uses a closed loop feed-back connection to the vehicle's steering control actuators 50 and servo-amplifiers 16, is designed to keep the vehicle steered on a course which zeros-out the subtracted signal $S = L - R$ and maximizes C. The various electronic equipment such as signal generators 52, signal amplifiers 54, signal analyzers 56, and signal processors 18 that generate the amplitude profiles L, R, C and $S = L - R$ electronically within the vehicle's guidance package, as well as the analog-to-digital converter 20 that transform these analog signals into digital forms before they are fed into the vehicle's microprocessor 10 for processing, are well known in the electronic art and are shown in FIG. 7 symbolically in block form. The vehicle's microprocessor 10 analyzes these guidance signals numerically and generates the appropriate steering commands (which are designed to minimize $|S| = |L - R|$ and maximize C.) These numerical steering commands are then converted into analog signals (via the analog-to-digital converter 20), fed into the signal processor 18 and subsequently fed into the steering control actuators 50 and completing the closed loop circuit. Although the type of automatic guidance and control system described herein is unique to the present invention, its electronic control circuitry is similar to the one described in U.S. Pat. No. 3,970,840 entitled "Control Circuit For Vehicle Guidance Mechanism." For a detailed technical discussion concerning the use of microprocessors as on-board controllers, see "The Use of Microprocessors as Automobile On-Board Controllers," *Computer*, August 1974, pp. 33-36, by R. H. Temple and S. S. Devlin.

The vehicle's automatic steering system is shown schematically in FIG. 7 and illustrates the steering control linkage and connections to the guiderail proximity transducer 22, steering actuator 50 steering servo power amplifier 16, signal generator 52, signal analyzer 56, signal processor 18, analog-to-digital converter 20, microprocessor 10, steering angle $\theta$ steering angle sensor 58, hydraulic booster pump 60, manual/automatic drive switch 62, and emergency steering wheel torque sensor (automatic emergency cut-off actuator) 64. The torque actuator 64, is a fast acting, automatic release switch that immediately places the vehicle in the manual operating mode as soon as someone attempts to override the automatic steering system by applying sufficient torque to the vehicle's steering wheel. This "guide release" system is designed to allow a passenger to quickly take over complete manual control of the vehicle in any emergency situation that may appear in the form of an audio or visual warning signal generated by the microprocessor (based on analysis of the vehicle's various sensors) or to avoid hitting any obstruction in the roadway ahead that may have escaped automatic detection, without spending time pushing buttons or throwing levers.

The steering control logic in the microprocessor's memory (which comprises the automatic steering algorithm) is designed to be able to steer the vehicle using only the $L - R$ signals, without any C signals, or by using only the C signals, without any L or R signals. Furthermore, it is designed to be able to steer the vehicle using only one of the three guiderail locator signals L, C or R. Without going into the technical electronic details (which are well known in the electronic art) this emergency back-up steering algorithm can be easily designed by simply using the on-course amplitude profile of either L, C or R (all of which are stored in the microprocessor's memory) as an on-course "reference profile", and developing steering commands that steer the vehicle so as to keep the received amplitude profile as close to the on-course "reference profile" as possible.

However, the primary steering algorithm will be based on the $S=L-R$ composite signal profile as it is more sensitive and can thus provide a higher accuracy steering control. The three basic guiderail locator signals L, C, and R and their corresponding independent steering commands (that are generated from the three independent guidance algorithms using the "reference profiles" discussed above) are simultaneously and continuously computed and compared to the primary steering commands generated from $L-R$ to provide three independent sources by which to confirm these primary steering commands. These additional steering commands provide a two-level order of redundancy back-up in case of any failure in the primary system.

FIGS. 4, 5 and 6 can be used to further describe the automatic steering control system with reference to FIGS. 1 and 8. Let the steering angle $\theta$ (FIG. 7) be measured positive from the straight ahead position (0°) when the vehicle turns to the right, and negative when it crosses the straight ahead 0° position and steers the vehicle to the left. A negative steering angle is shown in phantom by $\theta'$. The automatic steering control, based on the primary $L-R$ steering signal, is designed so that when $L-R$ becomes negative as shown in FIG. 4B, or positive, as shown in FIG. 4A, the steering commands cause the steering angle $\theta$ to increase or decrease respectively. For example, suppose that the vehicle is on course and following a curving roadway to the left so that its steering angle $\theta$ is already negative. For definiteness suppose that the vehicle starts out, on course, with $\theta = -5.00°$ but after a short time the steering signal $L-R$ becomes positive as shown in FIG. 6. This means that the vehicle is not turning sharp enough to the left and its longitudinal axis of symmetry (i.e. center line) is passing to the right of the guiderail. After sensing the positive value of $L-R$, the microprocessor will compute a corrective course change such that the steering angle $\theta$ will be decreased still further, for example, to a new value of $-6.25$. The amount of decrease is numerically determined in the microprocessor by simultaneously analyzing a large set of real time data from many different on-board sensors (converted into digital form) such as the rate of increase of $L-R$, its positive amplitude, the vehicle's present speed, the instantaneous radius of curvature of its path (or $\theta$), and its present inertial mass as well as other variables that may even include local weather conditions and possible wheel/road skidding (or traction). These calculations will determine the optimum or most efficient corrective steering angle that will take the vehicle smoothly back to its precise, on-course path, directly over the guiderail. Since these calculations are performed continuously and essentially instantaneously, in real time, the vehicle will follow the guiderail even through complicated curves with uncanny accuracy and without ever deviating more than one or two inches from its precise, on-course path directly above the guiderail. This driving precision would be completely beyond the capability of even the most expert human driver and would be essentially unaffected by the most unfavorable weather conditions—including zero visibility fog.

The choice favoring the $L-R$ steering signals over the other guiderail locator signals, such as C, was not arbitrarily made. One of the most important aspects of this invention is the fact that all ordinary concrete roadways can be easily and cheaply converted to automated guideways without requiring any major reconstruction. But many concrete roadways, such as highways, were originally constructed with a skeletal framework of steel re-enforcement rods. These re-enforcement rods, embedded into the concrete roadway will also absorb some of the RF radiation from the transducer, become excited, generate eddy currents and set up their own magnetic reaction fields. These fields will distort the field generated from the eddy currents of the guiderail. Hence, even when the vehicle is moving uniformly directly over the guiderail, the presence of steel re-enforcement rods will cause the individual L, C and R guiderail locator signals to vary slightly in amplitude. Of course, the microprocessor can be programmed to recognize the presence of extraneous signals and eliminate their effect, but 100% elimination will be difficult, if not impossible to achieve. On the other hand, the steel re-enforcement rods are usually laid down in a grid pattern that is precisely transverse and longitudinal to the roadway. Thus, in view of the geometrical arrangement of the left and right search coils 40 and 44, the magnetic distortions caused by the transverse rods will always appear to be essentially identical in the L and R signals. Consequently, the substracted signals $S=L-R$ will automatically cancel out the distortions arising from these transverse re-enforcement rods. The longitudinally embedded rods will cause some distortion of $L-R$ but it could be rather easily corrected. The effect would not cause rapid changes because these rods are parallel to the guiderail. Furthermore, since the material mass per unit length of the guiderail will be much larger than that of the re-enforcement rods, the distortion effects they generate will be substantially washed out by the presence of the larger guiderail. If these distortions are left uncorrected, the maximum effect would be only a slight transverse displacement of the vehicle of about 1 or 2 cm from perfect alignment. Finally, it may be possible to adjust the frequency of the transmitted RF signal so as to make all of these steel re-enforcement rods completely invisible. See the article "Inductive Detection of Underground Metallic Pipes" *Proc. IEE,* Vol. 122, No. 4, April 1975, pp. 345-348 by E. B. Glennie, et al. Steel bridges will also cause some interference but since there would always be several inches of concrete between the roadway and the steel structure, the vehicle's automatic guidance system would have no difficulty maintaining its electronic grip on the steel guiderail.

The present invention will not only provide safe, all-weather, automatic vehicle guidance as described above but it will also provide automatic roadway identification, automatic position determination and automatic speed control as well. This will be accomplished by first considering every roadway that is to be equipped for automated travel and every lane therein and selecting an overall nominal schedule by which the automated traffic is to move. In particular, the system is designed so that all vehicles moving over any fixed point of automated roadway will have exactly the same speed. The speed may change at different points along the roadway (such as along curved sections) but it remains unchanged at any fixed point in that every vehicle passing over the point will have exactly the same speed. Thus every automated roadway will have its own unique speed profile which can be expressed analytically as a single valued function $V=F(P)$ where V represents the exact speed that a vehicle must have when passing over any given point P on the guiderail. Notice that if this speed profile (or speed function) F(P) is strictly obeyed by every vehicle moving over the roadway, there will be no possibility for collisions. In order to simultaneously provide slower speed profiles for large automatically controlled vehicles, such as trucks, and higher speed profiles for small vehicles such as private automobiles, the various lanes of a multiple lane roadway (such as a highway or boulevard) will be partitioned off into, for example, slow, medium and high speed lanes. In general, the speed profiles of an entire network of N different automated, multilane roadways can be expressed analytically by a matrix of functions $V_{ij}=F_{ij}(P_{ij})$ where the different roadways are identified numerically by $i(i=1,2,\ldots,N)$ and the different lanes in the i'th roadway by integer j, where $P_{ij}$ is any point along the guiderail embedded in the j'th lane of the i'th automated roadway.

Setting aside for the present, the question of automatic lane changing, automatic branching and automatic traffic control, (which presents a much more difficult control problem) the pre-determined speed profile design $F_{ij}$ adopted for a network of automated roadways introduced above will provide the key design element that will also give the vehicles completely automatic speed control essentially without any possibility of collision, with very high reliability and low operating cost. Although several different systems can be used to provide this automatic speed control feature on the automated roadway network operating according to the above speed profile design specifications, the preferred system adopted herein is one that requires a minimum amount of new hardware. Actually, this hardware does not exist in the prior art and has been specifically designed and presented herein for use within the present invention. It is the product of utilizing the RF proximity transducer already on the vehicle, together with the roadway's specified speed profile design $F_{ij}$ that must be obeyed by all vehicles at every point thereon. The result is a form of externally stimulated, passive "coded magnetic label" or "road sign" of an extremely simple design that requires no electronics or support systems, does not use any electricity, can never wear out, contains no moving parts, is not affected by the weather, and once installed, never needs maintenance. These "magnetic labels" will be called "passive speed control transponders" 66 and are embedded into the concrete roadway 28 in identical pair configurations adjacent the guiderail 26. Moreover, these speed control transponders 66 will also provide automatic roadway identification and automatic position determination so that the vehicle's exact position and speed can be continuously monitored by the on-board microprocessor and displayed on a small video screen on the vehicle's dashboard or control console.

These low cost, passive control transponders 66 are an important feature of the present invention because they, together with the relatively inexpensive guiderails, will enable the automated roadway system to become economically attractive for installation into perhaps thousands of miles of rural highways. All things considered, it is the benfits versus cost ratio of any invention that will determine its usefulness.

The passive control transponders 66 that are provided and disclosed herein are radically different from prior-art transponders and their design, construction and operation require description. Unlike all prior-art transponders, the "passive transponders" designed and used in the present invention are not required to establish any two-way communication with the passing vehicles. Moreover, in the present application, the message that they have to convey is always the same. This will enable their design to be extremely simple. When embedded as identical pairs on each side of a certain point $P_{ij}$ on the guiderail of the j'th lane of the i'th roadway of the automated network, their function to the microprocessor of an automatically controlled vehicle is to convey the basic roadway information and required vehicle speed $V=F_{ij}(P_{ij})$ that is associated with that point—analogous in principle to a simple road sign that conveys roadway information to the brain of an ordinary vehicle's human driver.

In the conventional vehicle, steering is accomplished by the driver's vision of painted lane dividers illuminated by incident light and he identifies the roadway, determines his position on it and controls his speed by visually reading road signs. The medium of information transfer is sight. In the present invention the basic medium of information transfer for the automatically controlled vehicles is magnetic reaction fields that are induced by local eddy currents inside the roadway by the vehicle's RF proximity transducer and picked up by the vehicle's search coils 40, 42 and 44. Thus, the basic design concept adopted for the passive control transponder 66 simply involves constructing it with metallic elements 68 of a certain geometric size and shape such that when it encounters the RF beam 46 transmitted from a passing vehicle's RF proximity transducer 24, the metallic elements 68 become excited by induced eddy currents to emit a characteristic magnetic field pattern or "signature." Thus, by simply changing the size, shape and relative position of these radiating elements 68 inside a relatively small, narrow plastic box-like object, its magnetic signature can be constructed by an easy, pre-determined procedure. Since there is an essentially infinite number of different magnetic field patterns or signatures that can be so constructed, these patterns are used to encode and store the roadway identification, position and speed information that is associated with a specific point along a roadway. The narrow box-like object containing these carefully arranged metallic elements becomes the passive control transponder 66.

These passive control transponders 66 are embedded as identical pairs on each side and equidistant from the guiderail as shown in FIG. 8 so that they simultaneously pass directly under the left and right search coils 40, 44 of a passing vehicle. The induced magnetic fields to be identified, are picked up by the left and right search coils 40, 44 that are also picking up the induced magnetic reaction field radiating from the guiderail 26. However, since the magnetic signatures from the control transponders are identical, they cancel each other out in the subtracted primary guidance signal L−R and have no effect on the vehicle's automatic steering system.

The preferred configuration of the passive transponder 66 adopted herein is 3 meters long, 20 cm wide and 10 cm deep. A cut-away, perspective view of a typical passive transponder 66 illustrating its interior construction is shown in FIG. 9. The metallic elements 68 are shown distributed in a typical arrangement such that when the vehicle's RF beam strikes them, they are excited sequentially in a certain pattern. The resulting, sequentially induced magnetic fields are picked up by the vehicle's left and right search coils 40, 44 as a string of magnetic field pulses, each of which has its own characteristic shape. The walls 70 of the transponder 66 are made of a plastic material that is invisible to the RF beam so as to not interfere with the fields generated by the excited metallic elements 68 therein. The signals received from the left and right search coils 40, 44 are kept separate from each other and simultaneously fed into the signal processor 18, and then into the analog-to-digital converter 20 whereupon they are fed into the microprocessor 10 for analysis. The first operation which the microprocessor 10 performs is a check to make sure that each incoming pair of pulses received from the two separate transponders is identical. This provides a simple means by which the correctness of the received information can be verified. The second step which the microprocessor 10 performs is to actually decode the pulse information into roadway identification, roadway position, distance to the next transponder and required vehicle speed. In addition, the vehicle's required acceleration and rate of change of acceleration at that point $P_{ij}$ is also transmitted and decoded by the microprocessor 10. The confirmation check and entire decoding process that is performed by the microprocessor 10 is completed almost instantaneously so that the entire data stream associated with the point as described above is essentially completed as soon as the last pulse is received. Thus, for example, an automatically controlled vehicle moving at 60 mph would pass over a 3 meter long pair of control transponders, receive the raw magnetic field pulse stream (induced by the vehicle's RF proximity transponder) and decode it into the above information in about 130 milliseconds. Notice that if a vehicle is moving reasonably close to the on-course path directly above the guiderail, the 2 meter wide beam width of the vehicle's RF proximity transducer is sufficiently broad to insure that both transponders will be simultaneously excited to radiate their magnetically coded signatures.

In the preferred embodiment, the elements 68 inside the plastic walled transponder 66 are divided longitudinally into two main sections $S_1$ and $S_2$ as shown in FIG. 9 and separated by an air gap 72 of 20 cm. The elements in the first section $S_1$ are used to generate roadway identification and position information while the elements in the second section $S_2$ are used to generate specified vehicle speed v, acceleration a, and the rate of change of acceleration å.

The electronic techniques involved in translating characteristic signal patterns into numerical or alphabetical representations are well known in the electronic art and will not be discussed here. Rather, we shall assume for purposes of illustration, that certain element configurations inside the transponder as shown schematically in FIG. 9 will generate certain characteristic magnetic fields that represent either numerical values, alphabetical characters or alphameric characters (both numerical and alphabetical characters) without going into a detailed technical discussion involving signal processing, signal analyzing, analog-to-digital conversion and pattern recognition. This technique of encoding various roadway information and speed commands into magnetic field signatures is similar in principle to that taught by E. Wesener in his U.S. Pat. No. 3,340,821 entitled "Transportation System."

Since roadway identification and position information will require more data transmission and storage capability than v,a, and å, the first section $S_1$ of the transponder (FIG. 9) will be the largest. It will be divided into several smaller subsections. The first subsection 73 will contain the name of the state and city (or nearest city) where the transponder is located. This can be represented by ordinary zip code numbers. This requires a numerical field length of 10,000 numbers (00000-99999). The next subsection 74 will contain a roadway category number that describes the type of roadway being traversed. This will be made according to the following numerical classification:

1 = super highway or expressway
2 = main highway (divided)
3 = highway (undivided)
4 = feeder highway
5 = main boulevard of a large city
6 = main street or artery in a large city
7 = street in residential area
8 = paved street in small town
9 = paved street in remote rural area The next subsection 76 is used to encode the actual name of the roadway being traversed (or the route number if it is a highway). A maximum field length of 30 alphameric characters is reserved for this subsection. The fourth subsection 78 identifies the lane number of the roadway j = 1,2,3,4 or 5. The fifth subsection 80 will contain the actual street address where the particular transponder is located. This number essentially corresponds to the address of the house or building that is located in a transverse direction at the side of the roadway where the transponder is embedded. (If the roadway is a highway without any houses or buildings alongside, this number could be any convenient reference number such as the distance to the next city or the like.) A numerical field length of 100,000 will be allocated to this subsection. The sixth subsection 82 will contain a simple binary coded message that states whether or not a branching roadway intersects the present roadway before the next transponder is reached (e.g. 0 = no; 1 = yes) and if yes, the identity of the branching roadway it becomes or connects to and whether it is a branch to the right or a branch to the left. The seventh subsection 84 will contain the exact distance along the guiderail to the next transponder (or branch point) with a numerical field length of 4 numbers (e.g 34.97 km.) Each of these seven subsections will be separated by air gaps 86 of 15 cm which contain no metallic elements, so that the magnetic signature of each subsection can be more clearly defined and recognized.

The second section $S_2$ of the transponder 66 will contain the vehicle's specified speed v (the first subsection 88), specified acceleration a (second subsection 90) and specified rate of change of acceleration å (third subsection 92) that are associated at the particular point on the guiderail where the transponder is located. Each of these subsections will have numerical field lengths of 5 digits each. If there exists a branching roadway between this transponder and the next transponder, there will be an additional section $S_3$ at the end of $S_2$ and essentially identical to it which contains different values for v,a,å and which are used in place of the other values in section $S_2$ by vehicles programmed to take that particular branch. Transponders that are located just before a branch point that have two different sets of speed commands v,a and å will be called Type I transponders. Transponders with only one set of speed commands that are not located just before a branch point are called Type II transponders. The operational details concerning branching are discussed below.

The above transponder design is based on and similar to the design of magnetic tape for data storage that are used in computing systems. The detailed construction of the individual metallic elements 68, their various shapes and sizes and how they are assembled in the transponder 66 to produce specific magnetic field patterns that represent the above alphameric characters is well known in the art of electronics and is not discussed here. It should be pointed out, however, that the transponder construction could be easily automated and mass produced on an assembly line basis by computer controlled "slave" assemblers similar to the automated, and well known, construction techniques of small components for television sets. This would reduce the cost to about $5 to $10 per transponder.

It is important to note that the construction of the passive transponders described above, based on coded magnetic signatures induced by the RF radiation of a vehicle's proximity transponder is carried out by essentially presenting a series of groups of metallic elements arranged in subsections with their faces positioned in a particular manner so as to absorb a portion of the incident radiation and induce eddy currents within them which generate the individual pulsed coded magnetic signatures. But this passive construction designs will also reflect a portion of the incident RF radiation that also has a characteristic field pattern that is also uniquely determined by the same physical arrangement of the metallic elements. Consequently, this reflected pattern can also be used to encode all of the above information into characteristic pulsed reflected signatures. This second information transfer medium from transponder to vehicle would require the addition of on-board radio receivers inside the vehicle but this extra cost would be small compared to the benefit of having an independent medium of information transfer available for receiving the coded information. Thus, in an alternative embodiment of the present invention, the vehicle 34 will be equipped with three essentially independent radio receivers 94 and three independent receiving antennas 96, 98, 100 located slightly forward of and adjacent to the three magnetic field search coils 40, 42 and 44 respectively, as shown in FIG. 10.

Since the metallic guiderail 26 will also have the ability to reflect RF radiation, this radio receiver/antenna system will also be used to provide a second entirely new and independent back-up automatic guidance system for keeping the vehicle steered along the correct course directly above the guiderail. The detailed guiderail locator signals L, R and C received in the search coils 40, 42 and 44 and how they are used to generate all of the vehicle's automatic steering commands and the corresponding control logic discussed above is essentially transferable to the new set of guiderail locator signals L', R' and C' received in the radio antennas of 96, 98 and 100 respectively. However, in this case, L', R' and C' represent amplitude intensities of the reflected radio signals. To insure complete independence, this new sensor system will also have its own independent radio transmitter 102 and directional transmitting antenna 104 that also transmits a uniform 2 meter wide wedge-shaped beam downward which sweeps over a broad two meter wide region of roadway directly under the moving vehicle to irradiate the guiderail 26 and the transponders that are embedded adjacent to it. The transmitted radiation could also be pulsed at an extremely short time interval to incorporate the principals of radar and thereby allow the actual distance between each receiving antenna 96, 98 and 100 and the guiderail 26 to be measured. Their distance data could then be used to construct an entirely new steering command and control logic that would compliment the commands based on the L', R' and C' amplitude profile data and thereby provide an independent back-up steering command system. There are other methods that can be employed to sense the guiderail and decode the passing transponder information using reflected radiation such as applying diffraction analysis techniques. This new technique for sensing small metallic objects was developed by R. J. Teperek and G. S. Hobson and described in their paper "Microwave Diffraction For Steel Strip Detector", *The Radio and Electronics Engineer*, Vol. 47, No. 4, pp. 164–166, April 1977.

The complete separation of the induced "reaction magnetic field" sensing system from the "reflected radiation" sensing system will greatly enhance their individual operations because the RF proximity transducer 24 in the magnetic system will probably have an optimum operating frequency well below 50 megahertz, whereas the optimum operational frequency in the reflected radiation system may be in the 20 gigahertz (X-band) range or higher. Of course, the determination of these optimum frequencies will be based on the ability to accurately sense the guiderail, receive and decode the transponder signatures and the effects of varying weather conditions—including the ability to operate without serious degradation in very bad weather conditions that include the presence of a layer of water along the roadway that completely covers its surface including guiderails and transponders. This determination would probably require much empirical testing that may even show that each system may require its own special transponder design for optimum operation. (For example, the physical dimensions of the individual metallic elements required for the magnetic system may be much larger than the size needed in the reflected system and composed of different types of metal.) However, these matters involve basic engineering testing procedures that are well known and not considered here beyond noting that testing would be required and that two different types of passive transponders may be required. But the basic construction design of these passive transponders would be similar to that described above. Also, it should be noted that this testing may show that all things considered, one system is so much more superior than the other system, only the superior system should be used and the other completely dropped and not even used as a "back-up" system. For simplicity, we shall proceed with the present invention assuming that only the magnetic system is actually used, noting the fact that, cost permitting, both systems would be used at the same time.

As described above, when an automatically controlled vehicle passes over a pair of passive control transponders 66, all of the roadway and speed control information including the vehicle's required speed, acceleration and rate of change of acceleration that the vehicle must have at that particular point q (FIG. 2) is received and stored in the microprocessor's memory. Let these three speed related quantities be denoted by $v_q$ $a_q$ and $\dot{a}_q$ with the subscript q denoting the fact that they correspond to the point q. Let v, a and $\dot{a}$ denote the vehicle's actual, (i.e. instantaneous) speed, acceleration and rate of change of acceleration (that is continually being computed by the microprocessor in real time.) These quantities can be very accurately determined with accuracies on the order of ±0.001% by employing high accuracy, angular displacement sensors 106 that measure wheel rotation and an on-board clock 107 (FIG. 7). For example, suppose that the distance d along the guiderail between any two pairs of installed transponders is known with an accuracy of ±0.1 meters and that the vehicle's angular displacement 106 can measure rotation angles $\phi$ of the vehicle's wheels with an accuracy of ±0.1 degrees. Then if d is 8,000 meters, the quantity $d/\phi$=distance between the transponders divided by the total rotation angle that a wheel makes in moving between the transponders=$r\phi/\phi=r$ where r is the dynamic wheel radius. But since the maximum error of d is 0.1 meters and that of $\phi$ is 0.1 (max.$\Delta d$=0.1, max.$\Delta\phi$=0.00175 rad) the maximum error of $d/\phi=(\phi\Delta d+d\Delta\phi)/\phi^2=7\times10^{-6}$ meters=max$\Delta r$. Hence the vehicle's "reference" dynamic wheel radius can be actually measured to within an accuracy of ±7×10$^{-6}$ meters. Let $\Delta t$=a one second time interval. Then the vehicle's actual speed during that one second time interval=$r\phi/\Delta t=v$ where $\phi$ is equal to the wheel's angular rotational displacement during that time interval. Hence max$\Delta v \approx r\Delta\phi/\Delta t$=0.0008 meters/sec. Thus, we have the remarkable fact that the microprocessor will be capable of calculating the vehicle's instantaneous speed within an accuracy of better than ±0.001 meters/sec (which is about two orders of magnitude more accurate than conventional speedometers). Likewise, the vehicle's instantaneous acceleration a and rate of change of acceleration å can be calculated to within an accuracy of about ±0.001%. These are important capabilities because the safe operation of the entire system depends upon each individual vehicle moving over each point of automated roadway at the precise speed profile (i.e. v,a,å) that is assigned to it and which is conveyed to the vehicles by the control transponders.

Thus, as soon as the vehicle passes over the point q in the guiderail and receives the precise speed profile assigned to that point ($v_q$, $a_q$, $å_q$) the vehicle's microprocessor 10 instantly compares the vehicle's actual speed v with $v_q$ in order to first determine if any speed change is required. If they are equal, no speed change is required. This would be true in cases, for example, where the roadway is essentially straight and level over fairly large distances where the speed commands at the previous transponder, located at a point p several kilometers behind q were equal to the speed commands at q ($v_p=v_q$, $a_p=a_q$, $å_p=å_q$). Notice, however, that if two adjacent transponders over a straight and level roadway had equal speed commands, then the acceleration and rate of change of acceleration commands would have to be zero. Thus, $a_p=a_q=0$ and $å_p=å_q=0$, and the vehicle's speed would be constant over these points. The distance between points p and q may be 5 or 10 kilometers (which would be typical on automated highways passing through low population rural areas). In traveling between the transponder points p and q the vehicle's microprocessor 10 continuously compares its instantaneous speed v with $v_p$ and holds the vehicle to that specified speed $v_p$ by sending control commands to the vehicle's accelerator actuators 108 and braking actuators 110, FIG. 7, in a closed loop configuration shown schematically in FIG. 1. However, unless the vehicle is moving down a sloping roadway, the vehicle will maintain a uniform constant speed mainly by commands to its accelerator actuators 108.

If the roadway ahead makes a sharp curve where speed reduction is required, a pair of transponders are embedded in the roadway adjacent to point p on the guiderail 20 to 50 meters before the curve is reached. When the vehicle passes over this point and receives the new speed commands $v_p$, $a_p$, $å_p$, the microprocessor finds that $v\neq v_p$, $a_p\neq 0$ and $å_p\neq 0$ and immediately recognizes that a speed reduction has to be executed. The microprocessor executes this speed reduction by an almost instantaneous sequence of commands to the accelerator and braking actuators 108, 110 that begins with first obtaining the correct rate of change of acceleration å. Then, when the acceleration reaches the exact prescribed value of $a_p$, the vehicle's rate of change of acceleration å, is automatically adjusted to zero and held there for a small time interval until the vehicle's speed decreases to within a certain value close to the prescribed speed $v_p$. Then å is changed again to the prescribed value of $å_p$ and held there so that when the vehicle's acceleration a, changes values and approaches zero, it becomes exactly zero when the vehicle's speed v (which is continuously decreasing) reaches the exact prescribed speed $v_p$. The microprocessor determines the precise instant when these intermediate speed changes should take place so that the new vehicle speed $v_p$ is reached smoothly and exactly according to the given values for acceleration $a_p$ and rate of change of acceleration $å_p$. Thus, as soon as the prescribed speed $v_p$ is reached, the vehicle proceeds around the curve with the microprocessor now holding the vehicle at this new speed (via control commands to the accelerator and braking actuators 108,110 as described above). The values of $a_p$ and $å_p$ are now deleted (or ignored) in the microprocessor since their only function was to enable the vehicle to execute the required speed reduction in a precisely controlled manner that enabled the vehicle to have the prescribed speed over every point of guiderail where its speed was actually changing. After the vehicle completes the curve, another pair of transponders at a point q just beyond it, give the vehicle new speed commands $v_q$, $a_q$ and $å_q$ to be executed. The microprocessor instantly notices that the vehicle's speed v (which is equal to $v_p$) is not equal to $v_q$ and that $a_q\neq 0$, $å_q\neq 0$ and again immediately recognizes that a new speed change has to be executed. This execution is carried out via $a_q$ and $å_q$ by the same sequence of commands used to execute the prior speed change described above. Thus, the automatically guided vehicle will approach a curve, automatically reduce its speed to a prescribed value (by a precisely controlled speed change profile), pass around the curve and automatically increase its speed to another prescribed value (again by a precisely controlled speed change profile) and resume the automatic journey without any human intervention whatsoever. Consequently, the invention not only provides automatic speed changes but precisely controlled automatic speed changes, so that truly all points of an automated roadway network will have its own prescribed speed that are obeyed by all vehicles moving over them even when they are located in speed transition zones. Thus, it will be virtually impossible for two automatically controlled vehicles following each other to collide, even when the distance between them is small and when the roadway they are moving over has numerous sharp curves and straight sections together with wide variations in elevation. The two vehicles would automatically maintain an essentially constant separation distance.

In order to eliminate the possibility of a "drifing" or "touching" collision that might occur if the following vehicle begins to slowly creep up to the leading vehicle by a very slow rate over a relatively long time period (which could be possible even with strict speed control), the automated vehicles will also be equipped with an inexpensive, low power, collision avoidance system 112. This could be either sonic (see U.S. Pat. No. 3,493,920 entitled "Sonic Control For Self-Guided Vehicles") or radar (see U.S. Pat. No. 2,996,137 entitled "Automatic Radar Guided and Computer Controlled Vehicles".) Recent advances in radar systems for road vehicles are discussed by G. Hahlgauss and L. Hahn in their paper "Headway Radar Using Pulse Techniques," pp. 132-135, *IEE International Conference on Automobile Electronics*, July 6-9, 1976.

In the preferred embodiment, one radar transmitter 114 is connected to a wave guide 116 that carries the radiation to a small rotating transmitting/receiving antenna 118, mounted inside a spherical housing 120 on top of the vehicle 34 as shown in FIG. 11. This rotating antenna will therefore provide complete 360° radar coverage of essentially all of the space around the vehicle. The return signals are sent into the vehicle's central signal processor 18, then into the analog-to-digital converter 20 and finally into the vehicle's microprocessor 10 where they are used to simultaneously monitor the roadway directly ahead, behind and on all sides of the vehicle. As soon as any other vehicle or object is picked up approaching the vehicle from any direction, its relative speed of closure is instantly computed and the vehicle automatically adjusts its speed (if adjustment is necessary) so as to make a collision impossible. In heavy traffic situations (where they are vehicles directly ahead and directly behind), the vehicle will adjust its speed so as to automatically maintain a position precisely between the vehicle ahead and the vehicle behind.

The ability to provide automatic speed control as well as automatic steering control is an important feature of the present invention and will be fully exploited. It will enable heavy traffic to move expeditiously with unusually small separation distances (headway) thereby allowing the roadway to operate very close to its theoretical maximum efficiency and vehicle carrying capacity—a capacity far above that of manually operated vehicles.

So far, we have seen that the present invention described above will provide automated vehicular travel along roadways including automatic steering control and automatic speed control by using an inexpensive control system based on passive magnetic field guidance and passive transponders using shaped magnetic fields. However, we have not yet considered the important question of automatic switching or branching onto connecting roadways. Although this is an important and basic necessity of all vehicles, the prior-art appears completely devoid of any automatic branching system for trackless vehicles moving on essentially ordinaly concrete roadways. We shall show herein that the present system introduced above is ideally suited for automatic branching and, in fact, will provide this feature essentially without requiring any additional hardware, either for the vehicle or for the roadway. The only needed addition would be a simple "branching computer program" for the heart of the system—the vehicle's on-board microprocessor—which would be software with negligible cost.

Although no new hardware will be required for automatic branching, it is important to describe, in some detail, how the vehicle can be controlled to provide this new feature. FIG. 12 illustrates a roadway 28, equipped with a guiderail 26 embedded along its center, just below its surface, and a branching roadway 124 leading off to the right with a corresponding guiderail 126. Three pairs of passive control transponders are indicated by 128, 130 and 132 respectively. The point where the branching guiderail 126 intersects the non-branching guiderail 26 is denoted by P. Suppose a vehicle 34 is moving along the roadway 28 toward the branching roadway 124 on which the passengers of the automated vehicle wish to travel. The passengers need not concern themselves with the approaching turn-off because the vehicle already "knows" that its passengers want to take that particular branching roadway. In fact, the vehicle has known about that particular turn-off for some time—ever since its engine started. Before the automated voyage even begins, one of the passengers simply enters the desired route into the memory of the vehicle's microprocessor 10. This would be an exceedingly easy task that would involve essentially entering the desired route program into the microprocessor's control console 134 located on the vehicle's dash board 136. The process would be similar to making a push-button telephone call. A representative example of the instrument panels, various control equipment, instrumentation, microprocessor's video monitor 138, collision avoidance, radar video monitor 140 and microprocessor control console 134 and accessories for a typical automatically controlled vehicle is shown in FIG. 13.

After the desired route program is inserted into the vehicle's microprocessor, the engine is started and, if the vehicle is parked over a section of guiderail, it can be immediately switched to the automatic drive mode and the automated voyage begins. It should also be pointed out that before beginning the voyage, the microprocessor already has a complete "road map" or "street map" of the entire local network of automated roadways that covers the starting point and the desired ending point, stored in its memory. The raw memory storage capability of present, state-of-the-art, microprocessor in the $1,000 to $2,000 range is about 50,000 to 100,000 words, which is more than enough to store the entire city street map of the largest city.

Referring back to FIG. 12, as soon as the vehicle 34 passes over the (Type I) control transponders 128 which are located 20 to 50 meters ahead of the branch point P, it immediately receives and decodes all of the information that has been stored in their magnetic signatures as previously described. Since these transponders 128 are of Type I, this information includes the fact that there is a branching roadway approaching, its identity and the identity of the roadway it becomes or leads to, the fact that it branches to the right, and two complete sets of speed commands $(v_1, a_1, \mathring{a}_1)$ and $(v_2, a_2, \mathring{a}_2)$ that are the prescribed speed commands for any vehicle programmed to continue along the present roadway 28 as well as the prescribed speed commands for any vehicle programmed to follow the branching roadway 124 to the right respectively. Note that the transponders 128 do not receive any message from a passing vehicle and therefore do not know whether it will take the branching roadway or not. Thus, it simply conveys all of the information the vehicle needs, no matter what route it follows. This is an important design feature of the present invention because it results in considerable simplification, increases reliability and reduces installation cost.

After our particular vehicle 34 passes over the transponders 128 and decodes its magnetic signature pulses, its microprocessor instantly recognizes that its route command (or route instructions), that have been programmed into the microprocessor at the beginning of the journey, requires that the vehicle take the branching roadway 124 leading off to the right. Thus, the microprocessor 10 begins to automatically adjust the vehicle's speed profile to match the second set of speed commands $v_2$, $a_2$ and $\dot{a}_2$ (instead of the first set which is discarded) via the closed loop connections to the vehicle's speed actuators as described above.

While the vehicle is adjusting its speed profile to match the new speed commands, the amplitude of the steering signal received from the left search coil 40 (FIG. 12) is "carefully measured" in the microprocessor by an averaging process over a few meters of travel and stored in its memory as a constant "reference amplitude" denoted by $L_o$. Then, the primary guidance signal is shifted from the composite L−R signal to a new $L_o$−R signal where, as before, the real-time, instantaneous amplitude of the guidance signals received by the left and right search coils 40,44 are denoted by L and R respectively. At the same instant that this switch-over is made, the signal received from the left search coil 40 is temporarily switched out of the closed loop guidance circuitry. The transition to the new primary steering signal $L_o$−R is smooth and not even noticed by the control actuators. All of the automatic steering control functions and processes involving the steering actuators described above continue as if the guidance signal were L−R instead of $L_o$−R. This simple switching procedure takes place essentially instantaneously so that the vehicle is locked onto and is electronically gripping the guiderail 26 by means of the $L_o$−R steering signals well before the vehicle reaches the branch point P. By referring to FIG. 12 we observe that when the vehicle just passes the branch point P and continues a short distance along the straight path, the distance between the branching guiderail 126 and right search coil 44 gradually begins to decrease. But this decreasing distance to this guiderail 126 causes the signal R received from the right search coil 44 to gradually increase in amplitude. Thus, since $L_o$ is constant, the composite signal $L_o$−R begins to increase in a negative direction. But, as described above, when the composite steering signal becomes negative (as shown in FIG. 6) the vehicle's instantaneous steering angle $\theta$ is increased (positively) in an optimum computer controlled fashion which turns the vehicle to the right so as to cause the composite steering signal $L_o$−R to return to, and maintain the zero setting corresponding to the correct on-course signal (FIG. 6). If this steering command was executed in a "sloppy" manner such that $\theta$ was increased too much and too fast, causing the vehicle to move slightly too far to the right of the guiderail 126, the distance between the right search coil 44 and the branching guiderail 126 will increase. This results in a decreasing R signal (falling below the constant reference amplitude $L_o$) which causes the resulting composite signal $L_o$−R to become positive and to increase in a positive direction (FIG. 6). This results in an automatic decrease in the steering angle $\theta$ so that $L_o$−R is returned to and maintained at the zero, on-course, value (FIG. 6). When these steering control commands are taking place, the back-up steering signal C, received in the center search coil 42 is still playing an active and important role because it is used to constantly confirm the primary steering commands. To illustrate this, suppose the vehicle has just passed over the branch point P and begins to follow the branching guiderail 124 to the right. However, for some reason, suppose that the vehicle has unexpectedly crossed over the guiderail 126 (without detection) and is moving on the left side of it and also begins to move slightly away from it—on the left hand side. Hence, the amplitude of R begins to decrease because the distance between the guiderail 126 and the right search coil 44 begins to increase. Consequently, $L_o$−R would begin to increase in the positive direction which would be interpreted by the vehicle's microprocessor (FIG. 6) as meaning that the vehicle is moving slightly away from the guiderail on the right hand side. The resulting steering command, based on this $L_o$−R signal profile (which of course is designed to bring the vehicle back on course) directs the vehicle to move slightly more to the left. But when the microprocessor checks the C signal to confirm this corrective maneuver, it is found that its amplitude is decreasing instead of increasing as it should be. This contradiction is immediately recognized by the microprocessor and thus concludes that the vehicle is actually moving on the left side of the guiderail 126. Hence, a set of corrective steering commands is given that steers the vehicle slightly to the right until the amplitude of C begins to increase and approach its maximum on-course strength. Then, when it is at the maximum, the primary steering command signals is switched back to $L_o$−R (or to the normal L−R signal). This use of the C signal to confirm the steering commands of the primary composite steering signal described in detail above is designed into the basic steering control computer program and control system and is always used whether or not the vehicle is branching.

The procedure for automatic guidance onto left hand branches is identical to that described above for right hand branching except that the reference signal $L_o$, obtained from the left hand search coil 40, is replaced with a new reference signal $R_o$ that is obtained from the right hand coil 40. The primary steering signal is switched from the normal L−R to L−$R_o$ (instead of $L_o$−R as in the case of right hand branching).

Operating this vehicle in the automatic mode will offer other advantages and conveniences besides removing the tedium and strain of driving. For example, it will be almost impossible to run out of fuel in the middle of any particular automated voyage because once the selected route has been inserted into the microprocessor's memory (just before beginning the voyage) the computer will instantly determine the exact distance to be traveled by referring to the computerized "road map" that is stored in its memory. Upon dividing this distance by the vehicle's average linear rate of fuel consumption (i.e. kilometers per liter) determined from a previous journey (taking into consideration the vehicle's load, etc.) the exact amount of fuel required for the new journey is instantly computed. If this amount is less than the amount of fuel already aboard the vehicle, the "passenger" or passengers are immediately alerted by a flashing warning light 142 or sounder 144 and a "situation report" explaining this fuel deficiency is flashed on the video monitor 138 (FIG. 13) There are other advantages. When the microprocessor is computing the total distance of the journey, the total trip time is computed also (since the "road map" also contains complete speed profile information on each automated roadway entered therein). Hence, the exact time of arrival is obtained (to an accuracy of about ±30 seconds). Thus, before beginning the journey a complete status report is flashed on the video monitor 138 concerning the vehicle itself and important details of the trip including the distance (to within ±5 meters), the total trip time (to within ±30 seconds), the total fuel that will be expended on the trip (to within ±0.5 liters), the present fuel supply on-board the vehicle (to within ±0.01 liters), the amount of fuel remaining at the end of the trip (±0.5 liters) as well as the estimated time of arrival (±30 seconds). In this connection, it should be noted that sensors that measure a vehicle's various operating parameters and systems (such as: fuel, oil, transmission fluid, brake fluid, radiator coolant, power brakes, engine performance, hydraulic systems, electrical systems, tire air pressure, gas cap, electrical systems, windshield wipers, heater, air conditioner, etc.) and report their status to an on-board microprocessor for evaluation and transmission to digital readout displays on a vehicle's dash board are rapidly being developed and are available in the prior-art. See, for example, the articles: "The Microprocessor: In the Driver's Seat," by R. K. Jurgen, *IEEE Spectrum*, June 1975, pp. 73-77; "Sensors For Automotive Engine Control," by J. N. Reddy, *Automotive Engineering*, Vol. 85, No. 5, May 1977, pp. 36-39; and "Automotive Electronics II: The Microprocessor Is In," by G. Puckett et al, *IEEE Spectrum*, Nov. 1977, pp. 37-45.

An interlock inhibitor 146 is installed in the present automatically controlled vehicle that will prevent it from being driven in the automatic mode with an active route program that cannot be completed without causing the vehicle to run out of fuel. To solve this fuel deficiency problem, a passenger can simply press a button on the control console 134 that would temporarily remove the desired route program from the microprocessor's memory, place it on a mass data disk storage unit 148, and replace it with a route search routine that would automatically locate the nearest filling station and automatically construct a route program that would take the vehicle to this station. This would be easily accomplished because the "road map" would also contain the locations (i.e. street addresses) of all filling stations. As soon as this route program is constructed, the passenger simply pushes the execution button and the vehicle automatically proceeds to the nearest gas station. This computation of the detour route program to the nearest gas station would be accomplished almost instaneously. As soon as the microprocessor executes this detour program (i.e. as soon as the vehicle arrives at the gas station) the original route program is automatically recalled from mass storage unit 148 and placed back into the microprocessor's memory which becomes the next route program to be executed. (The microprocessor will automatically modify the program slightly to account for the new starting point.) As soon as the vehicle is refueled, the passenger simply pushes the program execute button and the automated voyage to the original destination begins.

The system described above is ideally suited for major cross-country, interstate highway networks and rural areas where bumper-to-bumper city traffic is non-existent and where the speed profiles on all roads could be easily pre-determined and regarded as fixed such that the speed profiles along the roadways can be expressed analytically as a matrix of single valued "speed functions" $V = F_{ij}(P_{ij})$ that depend only on the particular point $P_{ij}$ on the guiderail of the j'th lane of the i'th roadway. However, in major city areas, such as the freeway system in Los Angeles, traffic patterns vary greatly and it would be unreasonable to assume that all highways and streets therein could be assigned a fixed speed profile. Nevertheless, the system introduced above, utilizing miles and miles of very "dumb" (passive) and inexpensive guiderails along the roadways, with one very smart and also inexpensive microprocessor in each vehicle, will provide the ideal and basic starting design structure or framework for an automated system that can be easily extended to provide automated travel through the most complicated roadways and even city streets in very heavy traffic conditions while requiring relatively little new hardware. In fact, the only basic change would simply involve replacing the passive control transponders that was described above and used in low traffic, rural areas, with "active" control transponders 150 and connecting them electronically to a central traffic control computer 152. The basic vehicle design as described above remains essentially unchanged and no expensive new hardware for it is necessary. This will allow the same automatically controlled vehicle to be operated on rural automated roadways using passive transponders as well as on the automated roadways of a large city using active transponders.

The step from automated travel over low traffic density roadways with occasional branching, such as in rural areas and highways therein, to travel on roadways with very high density and variable traffic flows such as on the downtown central freeway system in Los Angeles or, on the still more complicated surface streets through the very center of the largest cities, is profound and requires some broad general description of how it will be accomplished before going into the technical details.

Basically, the solution adopted herein that allows this extended capability is the introduction of a computerized metropolitan or county-wide traffic control concept covering all streets, roadways and highways within a major city including those of all adjoining smaller cities and communities out to areas where it either joins a different traffic control area or where the traffic can be defined as rural. All traffic moving within a large traffic controlled area will be monitored in real time and controlled by a centralized traffic control computer. This is accomplished by connecting the computer electronically (via ordinary electrical wires or telephone lines) to every transponder in the entire area. These transponders will communicate with the automatically controlled vehicles by the same method of information transfer described above in connection with the passive transponders—namely coded magnetic field signatures. However, it should be emphasized that the guidance and information transfer medium could also be based on the "reflected radiation" method as described above which may turn out to be much more practical. We recall that transponders using this method of information transfer are based on coded reflected radiation signatures. The operating principals, however, are similar to those using magnetic signatures and for expediency we shall proceed with the system based on the latter.

The transponders in this traffic control area will be active in that part of their signatures can be changed by remote control via commands from the central traffic control computer. Hence this new extended design feature for changing and controlling the various individual speed profiles of all of the individual roadways in the traffic controlled area can be expressed analytically as a new matrix of "speed functions" $V = F_{ij}(P_{ij}, T)$ where T is a second independent variable denoting time. The functions $F_{ij}$ are now generated inside the single traffic control computer. This is the basic design difference between the "static" rural speed profiles $V = F_{ij}(P_{ij})$ and the new "dynamic" speed profiles $V = F_{ij}(P_{ij}, T)$ of traffic controlled areas.

In addition, these active transponders will also include relatively small magnetometers that detect the passage and speed of all vehicles moving over them, whether they are automatically controlled vehicles or not. Every time a vehicle passes over a pair of these active traffic control transponders, the magnetometers housed inside detect its passage and computes its speed (via a simple solid state "$2" microprocessor also housed inside the transponder) and instantly transmits the information to the central traffic control computer for analysis and data processing. The magnetometers will be calibrated to distinguish between small road vehicles and large vehicles (such as trucks, busses and the like) by recognizing basic characteristics in the vehicle's magnetic field signature and intensity. With all this traffic information being simultaneously and continuously fed into the traffic control computer in real time from every transponder in the traffic control area (which may be several thousand for large areas) the computer is able to determine and monitor the complete traffic pattern and flow for the entire area. Based on a detailed numerical analysis of this pattern and existing flow, the computer will determine the theoretical optimum flow pattern and specific speed profiles over each individual roadway corresponding to this optimum. The computer compares these optimum speed profiles with the actual profiles received from every transponder in every roadway in the entire traffic control area and gradually adjusts the actual flow to conform to the optimum by simultaneously adjusting the speed commands in each individual transponder to give the speed profiles corresponding to the optimum flow. In doing this the computer literally forces each individual vehicle to move with a specific speed profile that will produce an overall optimum traffic flow—and it forces this desired speed profile on each vehicle essentially simultaneously.

It was shown above that the automatically controlled vehicles are even "programmable" in that they can be programmed to follow a pre-selected route before the automated voyage even begins. However, if this voyage is within or through a traffic controlled area as described above, the degree of automation will be carried to even higher levels previously unimagined in the prior art. This new degree of automation and important feature provided in the present invention involves the very process of programming the vehicle's microprocessor will route commands that will cause the vehicle to follow a specific route. Specifically if the vehicle is to make an automated voyage within a traffic controlled area, even the route program can be provided automatically. And here is where the present invention leaps well beyond the capability of any human driver—the route program will be optimal with respect to the current traffic conditions. It will enable the vehicle to automatically maneuver expeditiously through the heaviest traffic situations to arrive at the desired destination in least time with the least fuel expenditure.

Although this optimal route selection capability may appear extremely difficult and complex to attain from a technical point of view, the solution is in fact quite simple and the required additional hardware for the vehicle will have negligible cost. It simply involves providing the vehicle with a relatively simple "modem interface" 154 that allows the vehicle's microprocessor 10 to communicate with the central traffic control computer 152 via ordinary data transmission channels using ordinary telephone communication systems. Since the vehicle is already assumed to have its own mobile radiotelephone communication 156, this part of the data link system (which would be the most expensive part) is already available within the vehicle. Thus, it is only necessary to provide the relatively inexpensive modem interface 154. However, in the preferred embodiment this interface 154 is not the ordinary modem where one places a telephone receiver in the modem's cradle and dials a number to the master computer to establish the data link as with remote computer terminals. Rather, it has its own built-in signal generator and processor that does not require the telephone receiver. It is activated and the data link-up is established merely by pushing one or two control buttons on the microprocessor's control console. The dialing process is necessary, of course, but the telephone number to the central computer is stored in the microprocessor. It is automatically activated by the one or two buttons. This avoids having to remember the correct telephone number to the central computer, dialing it on the mobile radiotelephone and placing the telephone receiver in a conventional modem that is rather bulky for the relatively small confines of an automobile. Thus, the journey begins by simply entering the vehicle's present position and desired destination into the microprocessor (which could be codified, for example, as simple street addresses and zip codes) and pressing the one or two buttons that establish the data link-up between the microprocessor 10 and the central traffic control computer 152. The microprocessor 10 transmits the vehicle's present position and desired destination to the traffic control computer 152 which analyzes the current traffic flow pattern and determins the optimum route that the vehicle should take in order to reach the destination in the shortest possible time and with essentially minimum fuel expenditure. This optimum route program is then transmitted back to the vehicle where it enters the microprocessor as the required route program. It is displayed on the video monitor 138 for viewing along with other related information including travel time, total distance, total fuel required and the time of arrival. This computed optimum route and related information corresponds to a present departure time. Thus, in order to be of even further assistance, the data computed by the central traffic control computer will even contain the estimated optimum route and its associated characteristics (such as trip duration, distance, etc.) that would result if the departure time were delayed to a certain future time—or to a set of several different future departure times separated by certain time intervals (e.g. 15 minutes). This extra information is also displayed on the vehicle's video monitor and will give the passengers the ability to select a departure time with more favorable traffic conditions.

If the optimal route is unsatisfactory because it does not provide certain desired conditions or characteristics (such as not driving along a desired road at a certain location that offers beautiful scenery) these desired conditions can be entered as "boundary values" or "constraining conditions" that must be satisfied. The computer link-up is re-established with the traffic control computer which now receives the problem again but with the additional constraining conditions. The corresponding conditional optimal route is calculated that provides the new optimum route that includes the desired conditions. It is transmitted back to the vehicle where it is also displayed on the video monitor so that it can be compared to the true optimum. The additional time and fuel required by the conditional optimum route is observed. If these time and fuel penalties are acceptable, the true unconditional optimal route is disregarded and replaced with the conditional optimal route.

On the other hand the passengers may wish to program the vehicle to follow a route of their own choosing. This would be completely acceptable because the basic function of the traffic control computer is to monitor and analyze the current traffic pattern and flow characteristics and to adjust the speed commands in the traffic control transponders so as to produce an overall optimum movement of traffic, corresponding to the observed traffic, which will produce a minimum travel time and minimum fuel expenditure for the system as a whole. It cannot force vehicles to follow certain routes that are unacceptable to the passengers. It only establishes and controls speed profiles so that if a certain route is desired, the speed at which the vehicle traverses it is determined and controlled by the traffic control computer. When the vehicle is operating in the automatic mode it has essentially no control over its own speed. This is an essential feature which is designed into the invention in order to provide the high degree of automation with high traffic handling capability and safety together with low overall installation cost.

In this connection, suppose that the owner of an automatically controlled vehicle uses his vehicle in a relatively routine manner in that essentially all his trips are to the same stores, the same place of employment, the same gas stations, the same homes of his friends and to the same places of recreation. Also, suppose that he makes all of these trips via the same routes which he enjoys and doesn't want to change even though they may not be optimal. Then, instead of having to constantly re-program the same route instructions every time he wishes to make the same trip, he can simply store it on the "desk-file" mass storage unit 148 outside of the microprocessor's high speed core storage of later use. Many different route programs can be accumulated and permanently stored in this manner on a "floppy-disk" so that the owner (or other passengers) eventually builds up a "library" of selected pre-programmed route commands. He can index or identify them by his own coded access commands (i.e. route program number 1, route program number 2, . . . etc.) such that if he wants to take trip number 2, he merely has to depress one or two buttons on the control console 134 which automatically accesses the disk storage unit and electronically "pulls out" route program number 2 and loads it into the microprocessor for execution—the result of which is an automatic transfer to the desired destination via a desired route. (In addition, the return route program of a round-trip journey, could be automatically constructed by storing the original out-bound leg and reversing it in the microprocessor.)

The process of building a "route library" of route programs and executing them can be done in traffic controlled areas or non-traffic controlled areas. It would, in fact, represent a typical procedure representative of how the invention would be used and operated. In fact, the solutions to difficult optimal route problems that are solved by the central traffic control computer and transmitted to the vehicle's microprocessor would also be saved and stored on a floppy-disk route library if the same start-point-end point journeys are contemplated for future execution. Traffic patterns for the same days and times of day generally remain the same and it would be wasteful to ask the central traffic control computer to solve the same problem if past experience shows that the solution is essentially always the same.

It should also be emphasized that the "road map" for the particular traffic control area that is inserted and used in the vehicle's microprocessor when the vehicle makes automated journeys within that area can be taken out of the microprocessor and replaced with another "road map" for a new traffic control area when the vehicle is moved into that new area for travel therein. This would occur, for example, if a family, living in Los Angeles, moves to San Francisco. The computerized "road-maps" would be in the form of small inexpensive floppy-disks that are well known and used for cheap mass storage in the art of computer technology. They would be completely analogous to ordinary paper city street or road maps for conventional road vehicles. As many as 100 such floppy disks could be easily carried within the vehicle covering many traffic control areas of the largest cities as well as state wide "maps" for long distance inter city voyages. It would also contain at least one floppy disk "road map" for highway travel throughout the continental United States. Floppy disks are ideal for mass storage and disks as small as 8 inches in diameter can store as many as 500,000 "words" at a cost of about $5.00. For example, if the passengers on an automated, New York to Los Angeles cross country voyage (using their single cross country "road map") decide to take a week off the trip to stop in a large city such as Memphis, Tennessee to visit relatives or do some sight-seeing, they could stop off at a filling station in Memphis to purchase a "floppy disk" local city street map. The cross country road map is taken out of the microprocessor's memory and replaced by the traffic control floppy disk that includes the automated streets and highways of Memphis, Tennessee (i.e. the Memphis, Tennessee "local city street map.") This entire process of programming and executing route programs in the vehicle's microprocessor and/or storing them for later use on floppy disk route libraries and purchasing and storing floppy disk "road maps" for various cross country or traffic control areas is essentially identical to the execution and storage of ordinary computer programs for data processing well known in that art.

The raw computing power required for the central traffic control computer will be considerable. First, as explained above, it will have to simultaneously monitor the real-time traffic of essentially all road vehicles (automatically controlled as well as ordinary, manually controlled vehicles) that are moving on their respective journeys throughout the entire traffic control area. This may involve over one million individual vehicles of all types and sizes that are simultaneously moving in a traffic control area that itself may be many thousands of square kilometers in area. This will be accomplished by continuously receiving vehicle detection signals from perhaps one million active traffic control transponders that are embedded in the roadways. The computer will be continuously analyzing this traffic information to establish the varying traffic pattern and flow. Then, it would have to continuously determine the theoretical overall optimum flow profile that corresponds to the observed traffic pattern and send the required speed control commands simultaneously to each active traffic control transponder to produce this optimal flow and to keep adjusting these speed commands to keep the traffic moving at the optimum flow at essentially all times. In addition, the computer will be called upon to determine optimum routes of individual vehicles that are to make automatic voyages through existing traffic to reach specific destinations. There may be several hundred such requests for this computer assistance every minute. Thus the raw computing power of the central traffic control computer must be tremendous and represents an important prerequisite that must be provided before this "traffic control" aspect of the present invention can be realized. However, such a computer does exist and it is the Cray-1 "Super Computer."

The Cray-1 Super Computer has been operating since early 1977 and should be able to provide the required performance. The performance details of this "Super Computer" can be found in the article "The Role of Microelectronics in Data Processing," by L. M. Terman, *Scientific American,* September 1977, pp. 163–177. If needed, a computer of almost unimaginable power could be made available as the central traffic control computer by operating several of these Cray-1s in tandem. This would simply involve connecting each computer to each other in a parallel configuration that is well known in the art of computer technology. It should also be emphasized that with the present rate of development in computer technology (which is expected to continue essentially unchanged for the next 10 years) even the Cray-1 "Super Computer" will be considered relatively low power in the very near future. The present invention has, in one sense, been designed with an overall methodology that takes maximum advantage of this rapidly advancing field. This will lead to an almost unimaginable degree of vehicular automation that will even increase with the passage of time without having to change the basic guideway design or any of the hardware installed along the roadways or even in the vehicle while enabling the operating cost to actually decrease—similar to the invention of the telephone and the operating system that was designed to support it.

While the above description does provide a rather comprehensive view of the present invention and how it will operate in the complicated traffic control areas (along with the required basic software and its operation) it does not describe the detailed technical design of the active traffic control transponders that the system is based on. We now consider these technical design details. Before proceeding, however, it should be noted that the basic invention, using automatic steering via passive guiderails embedded into the concrete roadways, remains unchanged and is the very foundation of the present invention. The technical details of this primary guiderail system was described above.

The active transponders used throughout the traffic control area will have two essentially identical designs tailored for their two basic regions of applications: (1) microtransponders used along roadways that are in the vicinity of branching roadways, including lane changing and (2) transponders used along roadways that are not near any branching or lane changing roadways but within the traffic control area. These transponders are the two design counterparts of the Type I and Type II passive control transponders that were considered and described above. However, in the case of active transponders, the differences will be minor. The basic operating principals between the two types are identical.

FIG. 14 is a perspective three-dimensional drawing illustrating the construction details of a Type I active control transponder 158. Two identical magnetometers 160,162 are located inside and near each end of the transponder 158 which is three meters long with a rectangular cross-section 20 cm wide and 10 cm deep. The magnetometers 160 and 162 are fed by electric power from a power conditioner 164 housed in an electronic support system section 166 located near the center of the transponder 158. The power conditioner 164 is itself fed by an electric power line 168 that is connected to the local roadway utility power grid used for electric street lighting and the like. In case the utility power supply should fail, the power conditioner 164 is provided with its own self-contained, back-up storage battery 170. The magnetometers 160,162 detect the passage of all vehicles moving over the transponder by sensing their magnetic moments. These include all automatically controlled vehicles as well as all conventional vehicles of all types and sizes. A typical automobile has a magnetic moment of about 200 ampere-meters$^2$ while larger vehicles, such as trucks and busses, have magnetic moments of about 2,000 ampere-meters$^2$. The detection signals from the magnetometers 160,162 that result from a vehicle passing over them are fed into a signal processor 172, a small analog-to-digital converter 174 and then into a small "$2.00" microprocessor 176 for analysis. The microprocessor 176 is also connected to a small electric clock 178 via the analog-to-digital converter 174. As shown in FIG. 14, the power conditioner 164, storage battery 170, signal processor 172, analog-to-digital converter 174, microprocessor 176 and clock 178 are centrally located inside the transponder's electronic system's support section 166. The first magnetometer 160 is located about 3 meters behind the second magnetometer 162 with respect to the passing vehicles so that when a vehicle approaches the transponder 158, the signals are first picked up by the first magnetometer 160 and then by the second magnetometer 162 a short time later.

The microprocessor 176 is continuously monitoring everything received from both magnetometers 160 and 162, whether or not they are receiving any signals from a passing vehicle. (The geometric configuration and construction of the sense coils inside the individual magnetometers are specifically designed to pick up magnetic fields directly above them and longitudinally along it while discriminating against any interfering fields generated by vehicles that may be passing by the transponder in other lanes along the same roadway. This discriminating design is well known in the art of magnetometer construction and is not discussed here.) As soon as the each magnetometer begins to pick up a vehicle that is about to pass over it (by sensing the signal strength and analyzing its rate of change in the microprocessor) it automatically begins to record and store the received signals (magnetic moment amplitudes). While this recording process is going on, the microprocessor is also receiving and simultaneously recording very accurate time signals from the clock 178. Thus, the recorded magnetic moment signals are obtained against a precise time reference so as to be in the form of a table of values of received magnetic moments m, versus time t, (which corresponds to the actual graph $m = m(t)$). This recording process is taking place from both magnetometers 160,162 but somewhat displaced in time because of their physical separation. However, the shapes of these graphs will be identical. Let M denote the maximum received magnetic moment (which will be identical in each magnetometer.) Consequently, by using a magnetic moment analysis program that is stored inside the microprocessor 178, and which uses M and the shapes of the graphs m=m (t) as input parameters, the threshold magnetic moment $m_1$ is computed that corresponds to the received magnetic moment at the instant $t_{11}$ the vehicle's front bumper is essentially exactly above the center of the first magnetometer 160. This stored computer program is designed to calculate this threshold value $m_1$ for any type of vehicle that passes over the transponder. Since it will obviously be different for large vehicles such as trucks and busses as opposed to small vehicles such as automobiles, this threshold value is a variable that has to be calculated for each passing vehicle. A similar calculation will provide the threshold magnetic moment $m_2$ that corresponds to the received magnetic moment when the vehicle has just passed over the magnetomer 160 but at the instant $t_{12}$ when the rear bumper is directly over the center of the magnetometer 160. These time instants will be slightly shifted in time for the second magnetometer 162 and will be denoted by $t_{21}$ and $t_{22}$ respectively. The "signal lengths" $\Delta T_1$ and $\Delta T_2$ can be defined as $\Delta T_1 = t_{12} - t_{11}$ and $\Delta T_2 = t_{22} - t_{21}$ respectively and correspond to the time intervals it takes for the vehicle to completely pass over the centers of each of these magnetometers. Notice that $\Delta T_1 = \Delta T_2$.

A representative example of the graphs m=m (t) corresponding to the received magnetic moments of a passing vehicle versus time, for each magnetometer 160, 162 are shown in FIG. 15. The graph's abscissa is correlated with a distance scale across the transponder 158 that corresponds to the relative position of the passing vehicle's front bumper as it moves across the transponder. Let $\Delta D$ denote the exact distance between the centers of the magnetometers (which is a known constant that is stored inside the microprocessor 176.) Thus, after computing the threshold values of $m_1$ and $m_2$ (which would require less than one second) the microprocessor 176 instantly calculates the speed V of the vehicle passing over the transponder by the simple formula $V = \Delta D/(t_{21} - t_{11})$. The vehicles's speed over the transponder can also be calculated by the formula $V = \Delta D/(t_{22} - t_{12})$. In practice, the microprocessor 176 is programmed to calculate the vehicle's speed by taking the average of these two calculated speeds by the formula:

$$V = (\Delta D/2)[(1/(t_{21} - t_{11})) + (1/(t_{22} - t_{12}))]$$

The signal lengths $\Delta T_1$ and $\Delta T_2$ introduced above can now be used to calculate the vehicle's actual length L by the simple formula $L = \Delta T_1 V$ or $L = \Delta T_2 V$. As before the microprocessor 176 will be programmed to calculate the vehicle's length by taking the average of these two quantities by the formula:

$$L = (\Delta D/4)[(t_{12} - t_{11}) + (t_{22} - t_{21})][(1/(t_{21} - t_{11})) + (1/(t_{22} - t_{12}))]$$

Let T denote the instant that the vehicle's geometrical center passes over the center of the transponder 158. Then by referring to FIG. 15 it follows that T can be calculated by the formula:

$$T = t_{12} + [(t_{21} - t_{12})/2] \text{ or by } T = t_{11} + [(t_{22} - t_{11})/2]$$

The microprocessor will be programmed to compute T by calculating the average of these quantities which becomes:

$$T = (t_{11} + t_{12} + t_{21} + t_{22})/4.$$

Finally, we shall introduce a fifth measurable physical quantity W which will be referred to as "magnetic weight" and defined as the integral of a passing vehicle's measured magnetic moment m taken over its length L. It will be expressed mathematically as:

$$W = \int m \, dl = \int_{t_{11}}^{t_{12}} m_1(t) \, v \, dt = \int_{t_{21}}^{t_{22}} m_2(t) \, v \, dt$$

The average value is:

$$W = \frac{1}{2} \left\{ \int_{t_{11}}^{t_{12}} m_1(t) \, v \, dt + \int_{t_{21}}^{t_{22}} m_2(t) \, v \, dt \right\}$$

and it is computed by a simple numerical integration routine that is also stored inside the microprocessor.

These five quantities V,L,T,M and W are immediately transmitted to the central traffic control computer 152 as soon as they are computed via direct electrical wires 180 or telephone lines. This entire process is computed almost as soon as the vehicle passes over the end of the transponder 158. As soon as another vehicle passes over, the computations are repeated and a new set of numerical values is transmitted. This process is simultaneously taking place inside every active transponder throughout the entire traffic control area.

In general, identical vehicles (such as vehicles of the same particular type, make, year of manufacture and model) will have their own characteristic magnetic moment signature than can, essentially, be completely and uniquely identified by the number couple (M, W). In this way large trucks of a certain type will be easily distinguished from, say, large school busses or the like. Small automobiles will be easily distinguished from large ones, etc. Hence, with this additional information, along with V,L and T, the central traffic control computer will not only be able to monitor the dynamic traffic flow but also the detailed type of every individual vehicle that forms the traffic.

The specific type of magnetometer that could be used in the active control transponder 158 is similar to the one described by S. V. Marshall in his paper entitled "Vehicle Detection Using a Magnetic Field Sensor," *IEEE Transactions on Vehicular Technology,* Vol. VT-27, No. 2, May 1978, pp. 65–68. This paper also describes the various magnetic moments that are characteristic of different types of vehicles and the nature of the corresponding signals they produce in the magnetometer. The paper also describes how these signals are used to operate and control various types of "slave" electronic sub-systems such as electric relays and the like.

Although the above magnetometer system will provide the capability to obtain the most important traffic flow information at each transponder (i.e. V,L, T) as described above, there are other devices that could be used in place of the magnetometers to provide the same information that may be more reliable and accurate. For example, the two magnetometers 160,162 could simply be replaced with low power, close proximity radar antennas 182,184 as shown in FIG. 16. They would be continuously transmitting relatively weak radar beams upward in a vertical direction. Hence, as soon as a vehicle begins to pass over the transponder 158, it first intercepts the beam of the first antenna 182 at time $t_{11}$ which is instantly picked up as a reflection. The vehicle continues to move over the transponder and intercepts the beam from the second radar antenna 184 at time $t_{21}$. The times $t_{12}$ and $t_{22}$ are the instants when the vehicle completely passes over the first antenna 182 and second antenna 184 respectively and are detected as the instants when the reflections from antennas 182 and 184 are terminated respectively. Thus, the formulas used to compute V, L and T inside the microprocessor 176 using signals from magnetometers as described above, can also be used to obtain these same quantities using reflected radar signals instead. In order to reduce the amount of hardware required for this radar assisted transponder, only one radar transmitter 186 is used which is centrally located inside the electronic support systems section 166. It is connected to the two transmitting and receiving antennas 182, 184, by two microwave waveguides 188 and 190 respectively. Unfortunately, the vehicle's maximum magnetic moment M and magnetic weight W could not be obtained using this radar system, but its possible advantages, such as increased accuracy and reliability, may off-set this loss of additional data. As an alternative, the magnetometers 160 and 162 can be replaced by simple low cost sonic detectors.

We have pointed out above that the passive transponder is designed to generate a specific magnetic signature that cannot be changed such that when a vehicle passes over it, the search coils 40,44 on board the vehicle pick up the signature which is decoded in the vehicle's microprocessor as specific roadway identification, position and speed commands that give the same values for every vehicle passing over it. In the active transponder, part of this "complete signature" will be controlled to produce varying numerical values for the speed commands v, a and å. The construction of the first part of the signature that contains the subsections that generate coded signatures for the transponder's zip code 72, roadway category 74 (e.g. city street, highway, etc.) name of roadway 76, lane number 78, street address 80, branching information 82, and distance d to the next transponder 84, remains unchanged as described above using passive metallic elements. A representative configuration of these passive metallic elements used to generate these seven data fields is shown in FIG. 9. Their ability to generate fixed magnetic signatures and the operation thereof has already been described in connection with the passive control transponders. All of the information that this part of the signature conveys to a passing vehicle is independent of local traffic conditions and can therefore remain constant.

The method used to replace the fixed magnetic signature for the speed commands v, a and å in the passive transponder by a variable magnetic signature so as to be able to change the numerical values of these quantities, is accomplished by replacing the passive metallic elements in the former transponder by active electrical coils or inductors 192 in the latter that can be individually energized in any combination by electrical currents supplied by the power conditioner 164. Hence, when a vehicle passes over this transponder, its search coils pick up an "apparent" or "artificial" magnetic signature for the speed commands that is essentially indistinguishable from those generated by eddy currents from passive metallic elements that correspond to fixed numerical values for v,a and å. But by changing the energizing currents in these inductors 192 (which can be accomplished essentially instantaneously) the numerical representations of these speed commands v, a and å can be instantly changed. In addition to v,a and å, the active transponders will also contain a fourth variable speed control quantity h. It represents the minimum allowed separation distance between two vehicles moving along the same guiderail. It is referred to as "headway". Thus, the term "speed commands" will also include this headway command and the set will be denoted by v, a, å and h. These coils are shown in FIG. 14.

The active traffic control transponders will always contain two completely separate and independent speed control subsections $SC_1$, $SC_2$ as shown in FIG. 16 by 194 and 196 respectively comprising variable inductors 192 which are able to generate independent speed commands. The "primary speed commands" are generated in the first subsection $SC_1$ represented by $(v_1, a_1, å_1, h_1)$ while the "secondary speed commands" are generated in the second subsection $SC_2$ and represented by $(v_2, a_2, å_2, h_2)$. The primary speed commands in $SC_1$ are controlled by signals originating directly from the central traffic control computer 152.

As described above, all of these active transponders simultaneously transmit detailed traffic flow parameters V,L,T, M and W for every vehicle passing over it to the central traffic control computer 152. The computer analyzes this raw input traffic data to determine the existing traffic flow pattern for the entire area in real time and to determine the theoretical "global" optimal speed profile for every individual roadway therein, represented by a matrix of optimized speed functions $V = F_{ij}(P_{ij}, t)$ for that particular time t, that will enable the traffic to move over the roadways with the most efficient speed profiles that will result in minimum total travel time with minimum fuel consumption. The computer 152 simultaneously adjusts the variable fundamental speed commands $v_1, a_1, å_1$ and $h_1$ in each transponder throughout the entire area to conform to this theoretical optimum traffic flow. The system, therefore, can be described as a tremendous computer controlled closed-loop, feed-back, traffic control system such that once an optimal traffic flow is established, it is maintained optimal (regardless of how the traffic pattern of the individual vehicles may change) by simultaneous and direct computer control of the speed profiles of every individual roadway in the system. Thus, the system is completely flexible in that it can easily adjust itself to meet any new traffic pattern that may develop such as a surge of new traffic resulting, for example, at the end of a major sporting event when thousands of new vehicles are driven into the existing traffic at a particular location, or simply increasing "end of work day" traffic.

The secondary speed commands in the second speed control subsection 196 are controlled by the microprocessor 176 located within that transponder 158. In Type I transponders, these secondary speed control commands are the commands that are executed by the vehicle if it has been programmed to take the approaching branching or lane changing guiderail. On the other hand, if the vehicle has been programmed to remain on the present guiderail, the primary speed commands received from the first subsection 194 are executed. However, both sets are always received and sent to the vehicle's microprocessor 10 to determine the set to be executed.

The design and construction of the active control transponders of the second type are essentially identical to that described above except that the fourth variable h in the second subsection 196 of Type I transponders becomes a time variable t. The operational features of Type II transponders will be discussed later.

The detailed electronic wiring 198, the particular geometric shape, size and assembled configuration of the individual inductors 192 and their energizing electric currents used to generate a pre-determined and variable "artificial" magnetic signature as sensed by a passing vehicle's search coils 40, 44 involve the well known art of magnetic field construction and is not discussed here. Likewise, the various power amplifiers 200, the analog-to-digital converter 174 and other electronic support equipment used in converting computer generated control commands to corresponding electric currents in the power conditioner 164 that are used to energize the individual inductors 192 are also well known in the electronic art.

The design approach adapted herein to provide automatic branching and lane changing capability in traffic control areas is based essentially on the fact that the speed profiles of any vehicle moving over any roadway in the traffic control area is precisely controlled by speed commands originating from the active transponders which will be monitored by other near-by transponders that use the information to generate their own speed commands which are designed to make collisions impossible. FIG. 17 describes a representative example of a simple roadway configuration where two parallel lanes of roadway 204,206, equipped with guiderails 208,210 respectively, and active control transponders 212, 214 and 216, move traffic in the same direction, and are connected by a lane changing guiderail 218. This lane changing guiderail 218, therefore, allows vehicles 220 moving along the left hand lane 204 to change lanes and merge with the vehicles 222 moving along the right hand lane 206. This lane changing maneuver is to be executed completely automatically and represents one of the most difficult maneuvers to achieve especially when heavy traffic is moving along both lanes as shown in FIG. 17. However, if this local branching problem becomes severe so as to cause a congested situation that "backs up" the traffic in either lane, the central traffic control computer, that is constantly monitoring the local as well as global traffic flow, will automatically issue broad speed control commands to adjoining transponders over a possibly large area surrounding the locally congested area to immediately alleviate it. Thus, since the central traffic control computer is continuously monitoring the entire flow, even the initial phases of a potential congestion of traffic will be essentially eliminated. In this way even local congestion can be kept to a minimum and the overall optimum flow will be maintained.

The details describing how this completely automatic, collision-free, branching and lane changing traffic problem is solved can be better understood by referring to FIG. 17. The figure is drawn to show one vehicle 224 in the process of changing lanes, another vehicle 226 programmed to continue moving along the left hand lane 204, another vehicle 228 is programmed to also make the lane change, followed by another vehicle 220 in the left hand lane 204. The points P and Q represent the points where the lane changing guiderail 218 begins to leave the left guiderail 208 and joins the right guiderail 210 respectively. The traffic control transponders 212, 214 and 216 in the immediate vicinity of these branch points P,Q, are designed to solve this local branching problem independent of the central traffic control computer. The (identical) pair of transponders 212 are embedded in the left hand lane 204 on each side of and adjacent to the guiderail 208 at a distance of 50 to 100 meters ahead of the actual branch point P. If the normal traffic speed for the lane in that area is very low, this "lead distance" to the branch point P could be less than 50 meters while if it were very high, the lead distance could be significantly greater than 100 meters. A second pair of transponders 214 are also embedded along the guiderail 210 of the right hand lane 206 and 50 to 100 meters behind the pair of left lane transponders 212. A third pair of transponders 216 are embedded in the right lane about 10 to 15 meters beyond the merge point Q.

Every time a vehicle passes over the right hand lane transponders 214, its speed, length and exact time of passage parameters (V,L,T) are calculated inside their microprocessors as described above and the results are instantly transmitted to the microprocessors inside the left land transponders 212. This information is also transmitted to the central traffic control computer 152. In addition, the microprocessors inside the right lane transponders 214 also instantly relays to the microprocessors to the left transponders 212 the exact speed commands that it transmitted to the vehicle moving over it along the right lane. The microprocessors inside the left lane transponders 212 uses all of this information to compute the vehicle's exact trajectory as it moves along the right hand lane 206. These trajectory calculations are performed and stored inside these microprocessors each time a vehicle passes over the right lane transponders 214. As many as 100 such trajectories corresponding to 100 different vehicles following each other along the right hand lane can be computed and stored in this manner inside the microprocessors of the right lane transponders 212. (The trajectories also include the length of each vehicle). These microprocessors use these trajectory calculations to continually calculate secondary speed commands $v_2, a_2, \dot{a}_2$ and $h_2$ for hypothetical vehicles, thay may pass over them at any time, that are designed to allow them to take the branching guiderail 218 and merge with the calculated traffic moving along the right hand lane without colliding with it and doing so in the smoothest and most efficient manner. Thus, the speed commands in the second subsection 196 of the left lane transponders 212 are continually changing to give these commands to any vehicle that may pass over them at any time, which is programmed to take the merging guiderail 218. The transponders forward magnetometers 160 are used to "freeze" the varying magnetic signatures of these collision-avoidance speed commands from subsection 196 during the passage of any vehicle. This "freezing" interlock system also "freezes" the fundamental speed command signatures generated in the first speed command subsection 194 that are being controlled by the remote central traffic control computer. This "freezing" system is comprised of a pair of mechanical relays (or electronic gates or switches) 230,232 in each transponder that are activated by vehicle proximity signals picked up by the forward magnetometers 160 (or vertical radar 182) in each transponder as shown in FIG. 16.

If a vehicle does pass over the left lane transponders 212, it will be assumed to represent two different vehicles; one programmed to continue moving along the guiderail 208 via the fundamental speed commands received from the transponder's first speed command subsection 194 and another programmed to take the branching guiderail 218 with speed commands received from the transponder's second speed command subsection 196. The two trajectories corresponding to both of these cases are calculated and also stored inside the transponder's microprocessors 176 to be used in calculating future hypothetical collision-avoidance speed commands for the second subsection 196. They are also used to monitor and possibly temporarily over-ride the primary speed commands going to 194 originating from the central traffic control computer. This would eliminate the possibility of a second vehicle, moving under primary speed commands received from 194, from "rear ending" the first vehicle, which may be slowing down under secondary branching speed commands to take the branching guiderail 218. In addition, the trajectories of all vehicles passing over transponders 216 (located a few meters just beyond the merge point Q) are likewise calculated and stored in the microprocessors of transponders 212 and 214 which are incorporated into the determination of safe, collision-free, merging or non-merging speed commands. These trajectories will make it possible to detect any possible build-up of traffic at the merge point Q so that corrective speed commands can be instantly given at transponders 212 and 214. However, the possible build-up of congestion at the merge point Q will also be immediately detected by the central traffic control computer which can simultaneously issue corrective speed control commands over large areas so as to allow and maintain a new optimal flow corresponding to any given traffic pattern.

In FIG. 17 vehicle 224 is shown merging into the right lane traffic via the lane changing guiderail 218. But as described above, before this vehicle 224 even passed over the branching control transponders 212 in the left hand lane that are located well before the beginning of the lane changing guiderail 218 at point P, the vehicles 234 and 236 that continue moving in the right hand lane 206, already passed over the transponders 214 which calculated their exact trajectories (V,L,T) together with their primary speed commands ($v_1, a_1, \dot{a}_1, h_1$). All of this information was automatically fed into the microprocessors 176 of transponders 212, by way of data transmission wires 238, and accumulated in these microprocessors as a "traffic ehemeris" for all near-by vehicles moving along the right hand lane. Thus, the microprocessors 176 inside the branch control transponders 212, use this "traffic ephemeris" to compute and continually up-date precise merging secondary speed commands that are transformed into the electronically coded speed commands of subsection 196. Consequently, when vehicle 224 passed over these transponders, it received branching speed commands ($v_2, a_2, \dot{a}_2, h_2$) that automatically placed the vehicle on a safe, pre-calculated merging trajectory, designed to bring it into the right hand lane via the branching guiderail 218 at the precise optimum distance behind vehicle 234 and ahead of vehicle 236.

In order to carry out this plan, each clock 178 in each transponder throughout the entire traffic control area will have to be synchronized to give the same exact time, accurate to a small fraction of a second. This can be obtained by a "master clock" 240 located in the central traffic control computer. This "master clock" will send periodic timing signals to every clock in every transponder which will enable all the clocks to run at the same exact time. This clock 240 is shown schematically in FIG. 1.

It should also be noted that the minimum separation distance for all vehicles moving along the right hand lane 206 and approaching the transponders 214 is always large enough to allow vehicles from the left lane to safely merge with the vehicles on the right—and to carry out this merging process in the most extreme case where all of the vehicles moving along the left lane are to merge into the right lane.

Although the above detailed description concerns an automatic branching situation involving lane changing only, the operational principles remain the same for all possible branching situations regardless of how complicated they may be. The design is again based almost entirely on making maximal use of simple, low-cost microprocessors. This time, however, the main traffic control microprocessors are housed in transponders and embedded into the roadway. The capability of these microprocessors is well beyond the most complicated maze of multiple branching situations that would ever be needed in any practical situation.

As pointed out above, the application and use of Type II active transponders are confined to situations where the guiderail ahead does not contain any branch point before the next transponder is reached. However, these transponders do calculate a vehicle's speed V, length L, and time of passage T for every passing vehicle and transmits this data (along with possible M and W calculations) to the central traffic control computer 152 in return for primary speed control commands. (In normal situations these remote, computer generated commands will not change very often so that the data flow from computer to transponder will be much less than the data flow from the transponder to the computer.) These Type II transponders also save the measured trajectory information from a passing vehicle (as well as all of the primary speed control commands that were transmitted to it) which it uses to continually compute a set of possible "over-ride" speed commands generated in the transponder's second variable speed subsection 196. Unlike the primary speed commands generated in the first speed command subsection 194 that are controlled from the remote traffic control computer 152, the "over-ride" speed commands are computed internally by the transponder's own microprocessors 176. The computations begin after a vehicle passes over it and are designed to be received by any hypothetical vehicle following closely behind but with a dangerously close separation distance. Thus, any such hypothetical vehicle receives a secondary set of possible over-ride speed commands ($v_2, a_2, \dot{a}_2, t_2$) in addition to the primary set ($v_1, a_1, \dot{a}_1, h_1$) issued from the central traffic control computer that, upon execution, will cause the second hypothetical vehicle to automatically slow down via the new speed profile which it would automatically maintain for the prescribed time interval $t_2$. After this "speed adjusting" time interval is over, the vehicle will automatically execute the primary speed commands $v_1, a_1, \dot{a}_1$ and $h_1$ that was stored in the vehicle's microprocessor and which the first vehicle is following. The operational effect results in a simple automatic slowing down of the second hypothetical vehicle until a safe separation distance is reestablished, and then an automatic speed increase to match the exact speed profile of the first vehicle which would enable the separation distance to remain essentially unchanged thereafter. However, if no such "hypothetical" vehicle appears immediately behind the first vehicle, no corrective speed adjustment is necessary for any following second vehicle which would be automatically indicated by values in $SC_2$ equal to those in $SC_1$ but with $t_2=0$ (i.e. $v_2=v_1$, $a_1=\mathring{a}_1$, $\mathring{a}_2=a_1$, $t_2=0$). When this situation is reached the "over-ride" computations are terminated and the above values for $v_2$, $a_2$, $\mathring{a}_2$ and $t_2$ are maintained in $SC_2$ (until the next vehicle passes which cause the above process to repeat until a safe separation distance is assured for any following vehicle.) It should be understood, however, that all vehicles passing over these active Type II control transponders always receive two separate sets of speed commands. The primary set ($v_1$, $a_1$, $\mathring{a}_1$, $h_1$), originating from the central traffic control computer 152 and generated in $SC_1$ and a secondary set ($v_2$, $a_2$, $\mathring{a}_2$, $t_2$) of possible over-ride speed commands originating from the transponder's own internal microprocessor 176 and generated in $SC_2$.

The above operational features of all active control transponders essentially eliminate the need for any onboard radar as the system provided herein provides an active means for automatically monitoring the separation distances of all vehicles and the means for automatically adjusting them to safer distances when required, and this automatic and important safety feature applies to both branching and non-branching traffic. However, as described above, an on-board radar system would be required for rural areas using passive control transponders to prevent "drifting" or "touching collisions." This radar would also provide a collision-avoidance back-up system when used in traffic controlled areas. Actually a rural application would operate much more effectively by installing a few "modified" semi-active control transponders at strategic locations that do not require any central traffic control computer. This would enable the system to also provide automatic vehicle separation with the on-board radar acting as an automatic safety "back-up" vehicle separation system. These "semi-active" transponders would be essentially identical to the Type I and Type II active transponders described above except that no central traffic control computer would be used. The primary speed commands from $SC_1$ would be fixed. However, the secondary speed commands from $SC_2$ would be variable and controlled by microprocessors inside the transponders as described above to provide "collision-free" branching commands, for vehicles programmed to take lane changing or branching guiderails, or to provide an "over-ride" set of secondary speed commands to prevent any "rear-ending" or "drifting" collisions. Thus, in the preferred embodiment of the present invention, a relatively small, low power, on-board radar system as described above is used not because it is essential, but because it will provide a completely independent automatic "back-up" collision-avoidance system that would increase the overall operational safety. The radar return signals would be fed into the vehicle's central signal processor 18 and then fed into the analog-to-digital converter 20 for entry into the vehicle's microprocessor 10 where they are continually monitored and analyzed along with all of the other control signals. These signals could also be displayed on the video monitor 138 or on a conventional radar video monitor 140. It should also be pointed out that although the on-board radar system would not be needed in the automatically controlled vehicles, it would be useful to have anyway as it would be able to recognize potential hazards on the roadway, such as large boulders or fallen trees, that would not be detectable with the basic system.

It should be emphasized that all of the above calculations and electronic control processes involved in generating the variable speed command, magnetic signatures in each transponder location proceed in duplicate. Each transponder in a pair of transponders is completely independent from each other. Thus, the variable magnetic signatures in each pair are always checked against each other to make sure that they are identical. The probability that two independent transponder failures will occur at the same time and combine to generate the identical error commands is infinitesimal. It should also be pointed out that the above automatic branching and lane changing system designed herein for the automatically controlled road vehicles of the present invention makes no use of radar whatsoever. Yet, it will offer virtually error-free, completely automatic, all-weather operation in extremely high traffic situations and with any conceivable degree of branching complexity.

Although the operational features of the active transponders given above are based on the coded "magnetic signature" principle of information transfer from transponder to vehicle, it can just as well be based on the coded "reflected radiation signature" principle described above in connection with the passive transponders. The variable signature feature can be easily constructed by employing well known design principles of conventional transponders. For example, the vehicle simply transmits an unmodulated signal downward in a broad wedge-shaped beam from its on-board transmitter 102 via its directional antenna 104 and the reflections are picked up with a receiver 94 as described above with its left 96, center 98 and right 100 receiving antennas (FIG. 10.) The transponder is constructed to provide a coded return signal which can be isolated from all other return reflections. The variable part of the coded signal is essentially generated by conventional transponder construction methods such as superimposing a modulating frequency (or subcarrier) onto the reflected signal and actively switching this sub-carrier on or off in a rapid sequence which corresponds to the coded information to be transmitted. The receiver 94 detects the modulated return signals by means of an amplifier tuned to the sub-carrier frequency. By using very high frequencies (X-band or higher) extremely fast acting electronic switching devices (operating in the low nanosecond range) together with sophisticated modulation (information carrying) techniques, and using a series of several of these active "element transponders", a truly vast amount of coded information can be conveyed to the vehicle using an active transponder design 3 meters long. This transponder system may also produce a much higher level of all-weather reliability. The vehicle's maximum magnetic moment M and magnetic weight W could still be obtained by installing magnetometers as described above. The basic operating principles of a suitable active transponder "element" can be found in the paper, "Identity Transponder System For Vehicle Location," by C. D. McEwen, *IEE International Conference on Automobile Electronics,* 6-9 July, 1976, London, England, pp. 108-111.

Since the transmitted radiation to the active transponders of this type would have a frequency near that of its on-board radar, a separate vehicle transmitter/receiver system for communication with the transponders is actually unnecessary. The radiation can be obtained by using a portion of the radiation generated by the radar system. Simple "bleed" microwave waveguides 242, 244 can be connected to the vehicle's radar transmitter 114, to supply the required unmodulated microwave radiation to interrogate the transponders by connecting the waveguides 242,244 to a pair of broad directional antennas 246, 248 that throw the radiation vertically downward in the form of two completely separate, broad 2 meter wide wedge-shaped beams 250, 252 from under the vehicle's front and rear bumpers respectively (FIG. 18). These antennas instantly pick up the return signals from the transponders which are also sent to the radar's transmitter/receiver 114 for amplification. They are subsequently fed into the signal processor 18 and analog-to-digital converter 20 and then into the microprocessor 10 for decoding. These two vertical radiation transmitting and receiving antennas 246, 248 also provide two essentially independent transponder interrogating systems by which the return signals can be compared for error detection. These two beams 250,252 propagated under the front and rear bumpers therefore provide a total of four essentially independent transponder signals (which should all be identical) since the transponders are embedded into the roadway as identical pairs, adjacent to each other and on each side of the guiderail. In addition, the exact times of passage $t_{11}$ and $t_{21}$ of the vehicle's front bumper over the first diode and last diode in the pair of transponders (near the beginning and end of each transponder) respectively can be very accurately determined (via its internal clock 178.) Similarly, the exact times of passsage $t_{12}$ and $t_{22}$ of the vehicle's rear bumper over the first and last diode respectively in each transponder can also be determined. Thus, the vehicle's speed V, length L and time of passage T over the center of the transponder pair can be very accurately computed in their microprocessors 176 by using the same formulas derived from magnetometer measurements described above. All of the coded information that must be transmitted to the vehicle (including all of the fixed roadway/transponder identification and position information as well as the variable speed commands) is transmitted in the same, essentially conventional manner as described above. Of course, the coded variable speed commands are controlled from either the remote central traffic control computer or from its own internal microprocessor. The variable speed command control electronics is comprised essentially of the internal signal processor and support electronics that are coupled directly to the various diodes that generate the actual coded modulation and "on-off" signatures that make up the coded speed commands. The detailed design electronics are well known in the art (e.g., see for example McEwen's paper on identity transponders.)

Finally, this "bleeded" radiation from the vehicle's on-board radar transmitter 114 can also be used to generate the basic guiderail locator signals based on the "reflected radiation" principle described above. In this configuration, the vehicle's entire RF proximity transducer system could be entirely removed, along with the three search coils 40,40 and 44. Each of the two new transmitting/receiving microwave antennas 246,248 could be easily adapted to provide three distinct sources of signal reception that operates as though the received signals were coming from three distinct and separate antennas—one to the left, one to the right and one directly above the guiderail. These would pick up the reflected guiderail locator signals L', R' and C' described above that would be used to provide the primary $S'=L'-R'$ and secondary $C'$ vehicle steering signals essentially identical to the $S=L-R$ and C steering signals described above in connection with the passive magnetic locator signals using the RF proximity transducer. The control technique used for steering the vehicle onto branching guiderails with the L,R and C magnetic guiderail locator signals would be essentially unchanged when using the L', R' and C' reflected steering signals. However, if this purely reflected radiation method is used to obtain automatic steering and automatic speed control, the passive metallic guiderail 254 should be made of aluminum as it would generate strong reflected guiderail locator signals. The automatically controlled vehicles shown in FIGS. 11 and 18 are designed to operate entirely in this reflected radiation mode describe above. FIG. 11 also includes a cut-away view of an active transponder 256 used in conjunction with this reflected radiation mode of operation that illustrates the relative position of the diodes (i.e. element transponders) 258, switching and modulator control system 260 as well as other components that have been previously described in connection with active transponders using the magnetic signature mode of operation. It should be emphasized, however, that no matter what type of basic mode of operation is adopted for actual use (i.e. "reflected" or "magnetic") the active control transponders will still be designed to be able to detect and compute the trajectories (V, L, T) of all vehicles passing over them whether they are automatically controlled or not. Hence, their basic design will always incorporate the use of either magnetometers, vertically propagating low power radar transmitters or sonic echo detectors to fulfill the design prerequisite.

As pointed out above, one of the basic and most important features of the present invention is that it will offer completely automatic travel along essentially all ordinary concrete roadways presently in existence with minimum modification and such that both ordinary and automatically controlled vehicles can use them at the same time. The only restriction put on the ordinary vehicles would be that they simply move along in the traffic at a reasonable speed so as to maintain reasonably safe separation distances and make lane changes at designated points over large changing guiderails—that would be clearly marked for human drivers to follow by painting them and identifying them by ordinary road signs. The presence of ordinary vehicles and their trajectories will be monitored and computed just as automatically controlled vehicles, because they are picked up by passive magnetometers (or vertically propagating radar or sonic transmitters) inside every transponder along the roadway. This unique and valuable feature is the result of adopting a basic methodology of design that simulates the operation and control of manually driven vehicles as much as possible. The result is a totally automatic trackless, roadway transportation system for both private and publically owned vehicles of all types and sizes that operates essentially the same as manually operated road vehicles. The human thinking processes of recognizing other vehicles, estimating their rates of closure and their trajectories and looking out for other traffic, obeying posted speed limits, etc., are accomplished by inexpensive, small microprocessors that are far more accurate and faster than the human brain. The mechanical operations involved in operating a conventional road vehicle by human limbs and muscles are replaced by fast acting control actuators and power amplifiers. This allows the basic operating features of the road vehicle to remain unchanged and thereby giving the vehicle the appearance that it is being operated by some human-like, super robot of uncanny intelligence that is capable of driving just as accurately in, and tolerating the traffic of, vehicles operated by mere human drivers. This enables the automated system to be constructed on all existing paved roadways—with minimum modification thereto—without the need for constructing specially designed guideways for special vehicles—such as the popular so-called automated "people-movers"—that would be very expensive for long distances. In the present invention, drivers of ordinary, manually controlled vehicles, need never fear the possibility that an automatically controlled vehicle will make a mistake and crash into them. The only vehicle that could crash into them would be other manually controlled vehicles, caused as usual, by human error. If there is a collision between a manually controlled vehicle and an automatically controlled vehicle, it would essentially always be the result of human error on the part of the human driver. Thus, the system would present the paradoxical situation where the driver of an ordinary vehicle would actually feel safer it he saw that all the passengers inside an approaching vehicle were in the back seat sleeping or watching television. (A mobile television 261 shown in FIG. 13 is also provided.)

Since the passive guiderails will be relatively inexpensive to install, it will be possible for a private home owner (or apartment owner) to have a small privately owned section of guiderail installed that would branch out from the roadway guiderail in front of the home (or apartment), into the private driveway and directly into the garage. Small inexpensive, specially designed transponders for private homes or apartments could be installed in the roadway to identify these branches (e.g. by street address.) As soon as a vehicle passes over the transponder and enters the driveway guiderail, the vehicle's microprocessor could send a simple command to an automatic, radio controlled garage door opener to automatically open the garage door. (Automatic, radio controlled garage door openers such as the "Genie" system have been commercially available for many years.) The vehicle would automatically enter and stop at a pre-determined point that has been programmed into the microprocessor (e.g., a certain exact distance from the last transponder in the roadway as measured along the branching guiderail) whereupon, it would automatically execute a complete engine cut-off and system shut down. The total installation cost of this presonalized guiderail section should not exceed the cost, for example, associated with installing connecting pipes for water and sewage to the municipal system. This relatively inexpensive added feature will result in the actual attainment of still higher levels of personalized automated travel that apparently exceed even the expectations and dreams of science fiction writers. For example, this relatively minor additional installation will enable the vehicle to automatically transport the children of a family to school, drop them off, and return to the home, open and re-enter the garage, shut the door and turn itself off without anyone in the vehicle whatsoever. Or, it could take any person to any local airport completely automatically, drop him off and return safely to the home, and proceed inside the garage—again without any human passengers. Since the vehicle will be equipped with its own mobile radiotelephone communication system, it will be possible for a person many miles away from home to actually "call up" his vehicle on an ordinary telephone and instruct it to pick him up at any convenient location. The actual communication between the person and the vehicle's microprocessor could be established via coded audio signals from a small pocket "beeper" similar to those operating with the popular remote-playback automatic telephone answering system. The commands would be relatively simple because he only has to give the vehicle the "pick-up" location. The vehicle's microprocessor will then automatically "dial" the remote central traffic control computer (on another communication channel) for the detailed route instructions to the specific location—which will be optimal—and which is transmitted to the microprocessor and stored into its memory unit. It then relays the exact time of arrival to the human and immediately sets out on the automatic voyage to pick him up. The system also has the built-in capability to allow the vehicle to automatically stop for additional fuel before the actual pick-up command is executed if additional fuel is required. The human attendant at the station would simply fill the fuel tank and bill the vehicle's license number as if it were a credit card. Sensors 263 on the fuel inlet conduit and fuel tank would "tell" the vehicle's microprocessor when the attendant removes the "gas" cap and is filling the tank. After the tank is filled, the attendant records the sale against the vehicle's license number. As soon as the attendant is finished and is ready to let the vehicle proceed on its automated journey, he simply replaces the gas cap. The vehicle is programmed to automatically leave the station and continue the journey 10 seconds after the cap is replaced. The vehicle arrives at the designated "pick-up" point at the exact time forecasted. The human passenger enters and the vehicle proceeds to automatically take the passenger home (or any other location) without requiring any human assistance.

The detailed guideway design at the filling station enabling this automatic re-fueling without passengers would be straight-forward. For example, the branching guiderail leading into the filling station from the main roadway guiderail passing in front of it, splits into several sub-branches, each of which has a straight section with several adjacent fuel pumps. This station layout would, therefore, enable as many as 10 or 20 automatically controlled unoccupied vehicles, to be refueled without causing any congestion at the station. After leaving the fuel pumps, the sub-branching guiderails are rejoined into a main guiderail leaving the station. Transponders at the main entrance and exit guiderails continuously monitor how many vehicles are being serviced inside the station at any given time. As soon as the maximum capacity is reached, a signal is transmitted to the main branching transponder on the roadway outside that prevents any new vehicles from entering the station. As soon as a vehicle leaves and passes over the exit transponder, the "OK" signal is transmitted to the roadway transponder which then permits a new vehicle to enter the station. The basic guiderail design principles of this station can be applied to almost any other building or location to provide stop-go, loading and unloading of passengers at hotels, theaters, airports and the like. It could also be used to provide automated parking lots where the vehicle can be automatically parked for several hours before departing on the next automated journey. This automated parking lot would be located at shopping centers, hotels, sport arenas and large centers of employment. FIG. 19 is a typical automated parking lot with main entering and exit guiderails 262,264 and three independent parking elements A,B and C together with their own individual entering 266,268,270 and exit guiderails 272,274,276 respectively. The individual guiderail equipped parking stalls 278,280, 282 for these parking elements A,B and C respectively are also shown. The main entering and exit transponders 284, 286 not only provide the branching traffic control commands as described above but also count the total number of vehicles entering and leaving the parking lot from which they compute the total number of available parking stalls at any given time. If there are no parking spaces available, the main entrance transponders 284 are programmed not to admit any more new vehicles. This is accomplished by "lot-full" signals that are transmitted to all vehicles via transponders 287. A passing vehicle's microprocessor 10 "sees" this "lot-full" signal so that even if it has been specifically programmed to take the approaching branching guiderail 262 that leads into the parking lot, the branching command will not be executed and the vehicle will proceed straight ahead and automatically enter the next "open" parking lot. Likewise, the transponders 288 and 290 count all vehicles entering and leaving the first parking element A respectively and compute the total number of available parking stalls 278 at any given time. If there are no stalls remaining vacant in this element A, the "element-full" signals immediately appear in its corresponding entering control transponders 284 which prevent vehicles from entering this element. This counting and control process is also carried out in the next parking element B with its entering and exit transponders 292 and 294 respectively. If this element is also full, the "element-full" signals also appear in its entering control transponders 298. The number of vehicles entering and leaving the third parking element are also counted by transponders 300 and 302 respectively.

Notice that in principle, this counting for element C is not really necessary as the number of vehicles parked in this element is simply equal to the total number of vehicles in the lot minus the total parked in elements A and B which are already known. The counting is made, however, and used as a means for verifying the total counting process.

Two magnetometers 304 are embedded adjacent to, and on each side of, the middle of each guiderail in each parking stall of the first parking element A. Each of these magnetometers 304 are individually connected to the transponders 288 by electrical conduits 306 that are also embedded into the concrete. These magnetometers (that are individually numbered according to the number of the parking stall they are located) pick up the magnetic moments of any vehicle parked over them and transmits the signals to the transponder's microprocessors. Thus, the microprocessors of these control transponders 288 are not only able to determine how many vacant stalls there are in its parking element but also their actual identity. The exact distances measured along the feeder guiderail 266, between the center of each parking stall and the center of the control transponder 288 are stored inside these microprocessors as number couples (i, $d_i$). The stalls are numbered according to the branching guiderail number. For example, the 4th parking stall of the first parking element A is simply the 4th left hand branching guiderail. If its distance is 31.24 meters, the stored number couple corresponding to the 4th parking stall is simply (4, 31.24). Similar magnetomer sensors 308,310 are embedded into each stall of the remaining two parking elements B and C along with their embedded connecting wires 312,314 respectively.

The operational details of this automated parking lot which allows automated vehicles to be parked without any human assistance whatsoever is as follows: The microprocessors inside the control transponders 288,292 and 300 of each parking element A,B and C respectively, select the nearest vacant stall number i and its distance $d_i$ and encodes these numerical values into the transponder's electronic signature (along with branching information and speed commands) ($v_2$, $a_2$, $\mathring{a}_2$, $h_2$). Thus, any approaching automatically controlled vehicle that has been programmed to park in this parking lot, passes over the main entrance transponders 287 that identifies the approaching parking lot, finds that it is not full (from the full, not-full signal), begins to execute the received, secondary branching speed control commands ($v_2$, $a_2$, $\mathring{a}_2$, $h_2$) that are specified for the approaching branching guiderail and, since the received information also indicates that the branching guiderail leaves the main guiderail to the right, switches its steering signals from the normal L−R (or L'−R') signals to the L−R (or L'−R') signals that causes the vehicle to automatically follow the right hand branching guiderail 262 which leads it into the parking lot. (The operating details of these steering signals have been explained above.) After moving a few meters along this branching guiderail 262, the vehicle automatically switches its steering signals back to the normal L−R (L'−R') signals. It then passes over the next pair of transponders 284 that control all traffic leading to the first parking element A. If this element is not full, the vehicle receives a "not full" signal, the branch direction signal (left in this case), and the branching speed commands ($v_2$, $a_2$, $\mathring{a}_2$, $h_2$). At this point the vehicle begins to execute these branching speed commands and prepares to take the left hand branching guiderail 266 by switching from its normal steering signal L−R (or L'−R') to L−$R_o$ (or L'=$R_o$') which causes the vehicle to automatically follow the left hand branching guiderail 266. After a few seconds, the vehicle's microprocessor then switches its steering signal back to the normal L−R (or L'−R') signal. The vehicle then enters parking element A, passes over transponders 288 and receives the number i and distance $d_i$ to the center of the nearest vacant parking stall. The transmitted information also includes the branching direction of the various parking stall guiderails 316 relative to the feeder guiderail 266 (left in this case) and the final set of speed commands (v, a, a, h.) After passing over transponders 288, the vehicle's microprocessor begins to execute these new speed commands, switches its steering signal to $L_o$−R (or $L_o$'−R), begins monitoring the precise distance that the vehicle moves since passing over transponders 288 and begins a "count down" starting from the integer N=i−1. This "count down" proceeds by substracting 1 from N each time the vehicle passes over a branching stall guiderail 316 that is detected by monitoring the L signal received from the left hand search coil 40. As soon as this "count down" reaches 0, the vehicle's steering signal is switched from $L_o$−R (or $L_o$'−R') to L−$R_o$ (or L'−$R_o$') which causes the vehicle to automatically swing into the first vacant stall i prescribed by the control transponders 288. Notice that if i=1, then N is already 0 and the steering signal is switched to L−$R_o$ (or L'−$R_o$') immediately after the vehicle passes over transponders 288. Since the distance to the center of the first vacant stall has been decreasing, the vehicle has been automatically slowing down as it approaches this last turn and the vehicle is automatically brought to a smooth stop precisely when its center is the exact distance $d_i$ from the center of the control transponders 288. When this is accomplished, the microprocessor automatically turns off the vehicle's engine and shuts down essentially all operating systems. The vehicle has entered the parking lot and automatically parked itself in a vacant parking stall with a precision and smoothness well beyond the capability of the most expert of human drivers. This automated parking lot feature will enable a person to actually conduct shopping while sitting at home in front of a closed circuit video monitor or television set. The various items presented and subsequently purchased can be automatically picked up by simply sending the vehicle to the shopping center's automated parking lot. The items purchased will be placed into the vehicle by a store employee. After all the purchased items are inside the vehicle, a clerk simply pushes a button, and the vehicle automatically returns home.

Suppose no one was inside the vehicle when it arrived and no rendezvous was made with a human passenger. The vehicle will be able to receive a "recall" command from its on-board radiotelephone communication system which essentially always remains on (after arriving anywhere without any passengers) so as to be able to receive new driving instructions. Suppose such a recall is made for the vehicle to automatically leave the parking lot and proceed to another destination. The vehicle's microprocessor 10 starts the engine, turns on all necessary support systems and proceeds slowly out of its automated parking stall. However, after passing completely over the embedded magnetometers 304, the vehicle begins to pass over another pair of transponders 318. These transponders convey new speed control commands (v, a, å, $\Delta t$) except the usual headway command h is replaced with a variable time interval $\Delta t$. If $\Delta t = 0$, the vehicle proceeds out of the stall with the specified speed profile (v, a, å) but if $\Delta t \neq 0$, the vehicle simply remains stopped for the specified time interval $\Delta t$ measured from the time the vehicle first started to pass over the transponders 318. This time interval $\Delta t$ and (v, a, å) are calculated inside these transponders with microprocessors that receive "traffic reports" from all other similar transponders 318 from all other parking stalls 278 in parking element A. The commands (v, a, å, $\Delta t$) are specifically calculated (as described above) to allow the vehicle to pass out of the parking element A without colliding with any other vehicle that might be leaving the same parking element at the same time. Once the vehicle leaves parking element A along the exit guiderail 272, other traffic control transponders such as 290 and 320 provide general traffic control commands as described above.

The above automated parking lot can be easily adopted for large apartments or office buildings where residents or employees have certain assigned parking stalls. In view of the above operating features, the vehicle's microprocessor can be easily programmed to enable the vehicle to automatically find and park at any specific stall. It should also be noted that although many traffic control transponders would be required in large automated parking lots, their construction would be much simpler than those used along roadways described above. This is because they would not have to provide any detailed roadway information such as identification, category, lane number, street address, etc. The elimination of all this data transfer capability would significantly reduce their construction cost.

The automatic control features described above which characterize the present invention obviously do not cover all of the possible traffic control situations that would arise in its practical application. For example, the question of control at pedestrian cross walks is not considered nor traffic control at ordinary street intersections carrying vehicles moving in perpendicular directions. However, the solutions to these and essentially all other traffic related problems can be rather easily solved within the basic operational framework of the present invention because the invention allows all traffic to be represented by mathematical trajectories, which is a result of the basic deterministic speed profile design of the automated roadways. The process of traffic control, therefore, simply becomes a straight-forward process of data processing using these trajectories to design future trajectories that do not intersect—with the data processing taking place inside various traffic control microprocessors along the roadway and in microprocessors inside the vehicles.

Finally, it should be noted that very rapid advances are currently being made in the field of direct voice communication between computers and humans. See, for example the article "The World of Science," *Mechanix Illustrated* March 1979, p. 8. The vehicle's microprocessor could be eventually fitted with a voice/analog signal converter/digital interface that would enable the human passengers to actually communicate directly with the microprocessor by voice commands.

The present invention provides the basic mechanical design, structural elements and operational principles that would enable a truly automated and comprehensive transportation system for essentially all road vehicles to be economically realized. The heavy use of computer technology inherent in the invention allows it to be adapted to various modes of operation and to provide special features of automated travel that is essentially limited only by human imagination. Yet all of the technology used in the invention is well known in the art of automatic control, computer systems and electronics. Its construction and application to the vast superhighway network already in existence would make possible an automated mass transportation system for road vehicles that would have unprecedented capacity and efficiency and would have far-reaching and revolutionary effects on society and on the entire economy. It would, in effect, combine all of the advantages of two totally different types of transportation, previously thought to be mutually exclusive in the prior art—the convenience and versatility of the small privately-owned automobile and the high passenger transfer capability, efficiency and economy of large fixed rail systems—while at the same time eliminating their obvious disadvantages. The invention would enable the vast urban superhighway systems to operate at maximum efficiency, reduce total travel time and significantly reduce the expenditure of fuel. It will totally eliminate the burden and strain of driving that is inherent in all ordinary, conventionally operated road vehicles and allows the operator to become another passenger in the privacy of his own enclosed vehicle (a feature totally new to the art of transportation). The present invention, therefore, would allow essentially all old, disabled, severely handicapped and even totally blind individuals to participate in the experience and convenience of having their own private automobiles and the dignity and independence of being able to operate them without assistance in productive and meaningful tasks.

Although the original invention and use of the present automobile has no doubt played a major role in advancing human civilization, its safety record is a tragedy of immense proportions that is difficult to comprehend in terms of human suffering. For example, the statistics show that during the last twelve years the total number of persons killed in automobile accidents in the United States alone was 614,716. This number is several thousand more than the total number of United States combatants killed in combat in all of the wars in the history of the United States beginning with the Revolutionary War through Vietnam and including the Cival War (*Information Almanac* 1979 pp. 420 and 780). The number of injuries caused by automobile accidents during these dozen years was 21,600,000 and the total direct monetary loss (destruction of property) was estimated to be over $444 billion. This direct monetary loss does not include related losses, such as loss of wages, etc. (See the article by R. L. Maxwell, "Looking Down The Road," *IEEE Spectrum* Nov. 1977, pp. 97-98.) Over 95% of these accidents were the result of human error on the part of the driver.

The above statistics clearly show that the automobile is a fairly dangerous invention to operate in its present form. Yet even with all of this overwhelming evidence, the basic operational principles of the automobile has, for all practical purposes, remained unchanged since its introduction 100 years ago without showing any signs of changing.

Modern technological developments such as microprocessors, transducers and the like are being used with increasing frequency, but their application is directed at assisting the human driver—not replacing him—with the effect of entrenching him still further behind the wheel and thereby reinforcing the basic principle of operation. Thus, if the prior art continues along its present course, these tragic statistics (along with the untold human suffering behind them) will only continue. The present invention, however, represents a complete break with this prior art and introduces, for the first time, an economical and comprehensive method for operating this extremely important and useful device—the automobile—without requiring a human driver and therefore essentially without risk of accident. This feature alone transcends all other benefits and advantages of the present invention.

In addition, the statistics suggest that the money saved by the elimination of the majority of these accidents would be more than enough required to install the automatic roadway system over wide areas. In fact, the amount of money saved over a 20 year period by the elimination of accidents may be more than the total construction costs incurred in converting essentially every concrete roadway in the United States to the the automated system described herein. Hence, after this certain "pay-back" period is over, the money not spent on accidents could be translated into direct savings on the part of every automated automobile owner. This savings would appear in the virtual elimination of automobile accident insurance which is currently averaging about $500 per owner per year.

But there are even other advantages that the system would provide. Studies have shown that if vehicular traffic were made to move more efficiently in even relatively small areas, it would have profoundly beneficial effects on fuel economy and reduced pollution from exhaust emissions. In fact, it is estimated that even a relatively minor improvement of traffic flow for the United States as a whole could result in a fuel savings of 800 million gallons per year. (See "Unjamming Traffic Congestion," *IEEE Spectrum,* Nov. 1977 pp. 77-79 by Edward Torrero.) But the system envisioned in the present invention will provide the optimum traffic flow with the highest possible efficiency. This would produce an annual fuel savings of several times this estimated 800 million gallon figure. It should also be emphasized that the reduction of travel time alone will result in the additional savings of billions of manhours that would otherwise be lost in daily travel to and from work. If this time savings were multiplied by the average hourly cost of labor, the annual cost savings represented by this reduction in travel time would total tens of billions of dollars.

The ease of mobility that the invention of the automobile provides has had a revolutionary effect on modern society. The convenience it offers ranks with the invention of the telephone and wireless communication systems. There is no reason to believe that the desire for this mobility will decline even with the increasing cost of fuel. The individual average use of the automobile will naturally decline somewhat with its increasing fuel costs, but its overall use should increase because of increasing population. This will result in a steadily increasing strain on existing main urban roadways that could render them essentially useless at peek traffic times within the next decade. But too much money has already been invested in their construction to let this happen—which, according to present trends, appears to be inevitable. Thus, unless some basic long term solution to this problem is found and acted on soon, it appears that a radical solution will be ultimately forced upon essentially everyone living or working in large metropolitan areas that may have very negative consequents to the social and economic well being of our entire country. Unfortunately, in view of the magnitude of the problem, any rational solution that could be adopted before reaching this point of no return will be fairly costly. The solution should be reasonably long term in that it should not have the likelihood of becoming obsolete within one or two decades and require complete replacement. Likewise, any partial solution that would require constant "up-dating" or "piece-meal modification" would also lead to prohibitively high costs.

The present invention will provide an ideal solution to this traffic congestion problem. For example, since the metallic guiderails are passive, they can have an extremely simple design such that their installation could be automated. Thus, in the preferred embodiment, they will have a flat, rectangular shape, 1 cm thick and 5 cm wide. These guiderails will be manufactured and mass produced as identical 10 meter long sections. As many as 500 of these sections could be loaded aboard a specially designed vehicle. This vehicle would follow directly behind another specially designed vehicle that is moving along the roadway and cutting a 1 cm wide, 6 cm deep groove into the concrete precisely along the roadway's center line. The second vehicle, carrying the guiderail sections, would be automatically inserting the guiderails end to end into the groove in a continuous process. This insertion process could be carried out with sufficiently high forces such that each individual guiderail section would be physically bent in any direction to precisely fit into the groove and match the roadway's contour even if the roadway is covex, concave or following a sharp curve. A third vehicle following close behind, applies a 1 cm layer of epoxy or similar material that would permanently fix the guiderail in the groove and insulate it from the weather so as to prevent rusting. This, 5 kilometers of guiderail could be completely installed within a few hours. And, after they are installed, they never require any maintenance. They do not carry any electrical current, they do not have any moving parts, they do not have to support any weight, and they are immune from deterioration or erosion due to operational wearing from continued use or due to weathering.

As an alternative construction method, the guiderails do not have to be even installed as completed rails at all. They could be actually "manufactured on site." In this method the first vehicle (that is cutting the groove into the roadway's concrete surface) is essentially unchanged but the second vehicle (that was previously carrying and mechanically inserting the completed guiderail sections) is replaced with a different vehicle. This new vehicle has a large on-board furnace that contains the molten metal of the guiderails. It follows directly behind the first vehicle and simply fills the groove with the molten metal. A gap of about 1 cm is left in the groove that is filled with epoxy. The temperature of the molten metal would be relatively low so that the metal is soft and more plastic like rather than a freely running liquid. This would enable the metal to be pumped into the groove without running even when the roadway has a steep slope. After the molten metal is pumped into the groove a third vehicle, following closely behind, would apply a 1 cm layer of epoxy sealing material. Since the molten guiderail would still be hot, this epoxy layer would be actually bonded or "welded" onto the upper surface of the metallic guiderail. As soon as this layer is applied, the result is essentially a finished guiderail. This process could be continued non-stop over many kilometers of roadway by constantly reloading the second vehicle with additional loads of liquid metal brought up from a central distribution point in special delivery vehicles. Thus, by employing several groups of these guiderail installation and delivery vehicles, the guiderail construction can simultaneously proceed over many different roadways at the same time. Many kilometers of guiderails could therefore be laid down along many different roadways each day. Hence, by adopting this method for guiderail installation, the manufacturing plant needed to produce the 10 meter long guiderail sections would be unnecessary. The guiderails would be actually manufactured and installed by one simple process with a relatively simple furnace vehicle. This rapid and simple installation process would enable every major highway and paved street of a large metropolitan area to be equipped with guiderails in less than one or two years, and perhaps even within existing budgets.

The traffic control transponders would be inserted as identical pairs into pre-cut rectangular slots located at strategic locations along the guiderail. Since these individual pairs would be usually located several kilometers from each other on highways their installation would also proceed rapidly. As described above, however, each pair would be different as they would have to transmit roadway position information that is unique to their particular location. These transponders would be systematically wired to the central traffic control computer that could then begin monitoring the traffic flow throughout the entire metropolitan area as described above.

Thus, the invention is ideally suited for mass production techniques that would enable the construction to proceed rapidly at minimum cost and essentially without any disruption to the existing roadways. In order to bridge the gap between non-automated and automated vehicular traffic, all conventional traffic light signals will also be wired to the central traffic control computer. (This could be rather easily accomplished by utilizing existing telephone lines.) This would allow the remote traffic control computer to simultaneously control all conventional traffic lights throughout the entire area in addition to sending speed commands to all of the traffic control transponders. Thus, even if all of the vehicles moving in the entire area were ordinary, manually-controlled vehicles, the central traffic control computer would still be able to monitor the complete traffic flow via signals received from the transponders and be able to simultaneously control the stop-go movement of all traffic throughout the entire area. This active control capability would be able to prevent the formation of congested traffic situations or at least, greatly reduce their size and frequency.

Thus, the present invention would be an ideal solution to the increasing urban traffic congestion problem as it would not only solve this critically important problem but it would also provide the basic structural framework that would allow a smooth transition away from the conventional—and very dangerous and costly concept—of human operated road vehicles to automatically operated road vehicles with all of the far-reaching and almost unimaginable benefits it would offer. Moreover, this concept of completely automated and optimally controlled vehicular travel along roadways would not become obsolete for a very long time. If the present laws of physics are not radically changed to provide, for example, the transportation of large physical objects via electromagnetic waves or the like, the present invention may be useful well into or even beyond the next century. It should also be emphasized that the invention can be adopted to essentially any type of vehicle propulsion system such as electric engines or the like and the roadways could all be placed beneath the earth's surface.

Many modifications and variations of the above embodiments can be devised by one skilled in the art without departing from the scope of the invention. Thus, it is intended that all matter contained in the above description or shown in the accompanying drawings should be interpreted as illustrative and not in a limiting sense.

What is claimed is:

1. An automatic guidance system for passenger carrying road vehicles comprising:
   a roadway;
   a passive metallic guiderail embedded longitudinally along said roadway;
   a vehicle on the roadway;
   means on the vehicle for transmitting a signal from the vehicle toward the guiderail;
   sensor means mounted on said vehicle responsive to a return signal from said guiderail for emitting a steering signal in response to the return signal;
   control means in said vehicle for continuously steering said vehicle in response to said steering signal from said sensor means so as to maintain said vehicle in a predetermined lateral position with respect to said guiderail as said vehicle moves along said roadway;

a plurality of control marker means for conveying coded information signals to said vehicle embedded along said roadway adjacent to said guiderail and spaced apart at various positions and wherein said coded information signals emitted from said roadway control marker means include roadway identification, position and a prescribed primary vehicle speed profile;

sensor means mounted on said vehicle responsive to said coded information signals received from said control marker means for controlling said vehicle;

decoding circuitry means on said vehicle for decoding said coded information signals received from said control marker means;

means for conveying said control information to a microprocessor on the vehicle;

clock means connected electronically to said vehicle microprocessor;

speed sensor means in said vehicle for determining said vehicle's actual speed profile;

odometer sensing means connected electronically to said microprocessor whereby the distance traveled by said vehicle between two points or between two clock times can be determined; and speed control means in said vehicle connected to the speed sensor means for adjusting said vehicle's actual speed to match said vehicle's prescribed speed profile received from said control marker means.

2. An automatic guidance system as set forth in claim 1 further comprising:

manual control means inside said vehicle that allows said vehicle to be controlled manually by a vehicle occupant;

a warning signal means mounted inside said vehicle;

sensing means adapted to activate said warning signal means when said sensing means detects a malfunction in said control means; and an emergency operating mode switching means by which said occupant can switch from an automatic driving mode to said manual driving mode.

3. An automatic guidance system as set forth in claim 1 further comprising an operating mode switching means by which said occupant in said vehicle can switch the operating mode of said vehicle from automatic to manual or from manual to automatic at any time.

4. An automated road transportation system as set forth in claim 1 wherein said guiderail sensor means is adapted to emit an increasing or decreasing signal strength depending upon whether its distance to said guiderail decreases or increases respectively.

5. An automatic guidance system as set forth in claim 4 wherein said control means includes:

a steering control actuator; and a servo power amplifier connected serially in a closed loop, feed-back control circuit with said sensor means and said steering control actuator for sending steering commands to said steering control actuator so as to maintain a generally constant signal strength emitted by said steering sensor means.

6. An automatic road transportation system as set forth in claim 5 wherein said guiderail sensor means comprising:

a central sensing means;

a flanking left and right sensing means responsive to said guiderail and emitting independent steering signals upon detecting the proximity of said guiderail;

said central, left and right sensing means comprising individual sensors mounted on said vehicle in a spaced apart configuration along a line transverse to the direction of travel;

said sensor means emitting steering signals upon detecting the proximity of said guiderail so as to maintain said vehicle in a predetermined lateral position with respect to said guiderail as said vehicle moves along said roadway; and said predetermined lateral position being maintained such that said central guiderail sensor means moves substantially directly above said guiderail while said flanking left and right guiderail sensing means move along the left and right sides of said guiderail respectively, and such that the vehicle's longitudinal centerline is substantially directly over said guiderail.

7. An automated road transportation system as set forth in claim 1 wherein said speed sensor means is adapted so as to provide continuous speed profile information to said microprocessor wherein the difference between said vehicle's actual speed profile and prescribed speed profile is substantially continuously computed.

8. An automatic guidance system as set forth in claim 7 wherein said speed control means comprises:

a vehicle accelerator actuator;

a vehicle braking actuator; and servo power amplifiers, connected serially in a closed loop, feed-back, speed control circuit with said speed sensor means, said accelerator actuator and said braking actuator, whereby said difference between said vehicle's actual speed profile and prescribed speed profile is maintained substantially at zero.

9. An automated road transportation system comprising:

a roadway;

a metallic guiderail embedded longitudinally along said roadway;

a vehicle on the roadway;

sensor means mounted on said vehicle responsive to said guiderail for emitting a steering signal upon detecting the proximity of said guiderail;

control means in said vehicle for steering said vehicle in response to said steering signal from said sensor means so as to maintain said vehicle in a predetermined lateral position with respect to said guiderail as said vehicle moves along said roadway;

a plurality of spaced apart control marker means embedded along said roadway adjacent to said guiderail for conveying coded control signals to said vehicle, said roadway control marker means including roadway identification, position and a prescribed primary vehicle speed profile;

sensor means mounted on said vehicle responsive to said coded control signals received from said control marker means;

decoding circuitry means on said vehicle for decoding said coded control signals received from said control marker means;

speed control means in said vehicle for adjusting said vehicle's actual speed to match and maintain said vehicle's prescribed speed profile received from said control marker means;

sensor means mounted within at least a portion of said control marker means responsive to the passage of said vehicle;

a microprocessor mounted within said control marker means adapted to monitor and control said coded speed profile signals emitted by said control marker means;

clock means within said marker means that coacts in combination with said marker vehicle sensing means and said marker microprocessor whereby the vehicle's actual speed is computed and stored inside said marker microprocessor along with its time of passage, representing said vehicle's trajectory; and said marker microprocessor adapted to generate safe speed profile control commands using said trajectory data that are transmitted by said marker means to any following vehicle so as to avoid possible rear-ending collisions.

10. An automated road transportation system as set forth in claim 9 wherein said vehicle sensor means, microprocessor means and clock means of said marker means are combined and adapted to enable said control marker means to determine a vehicle's actual speed and approximate length as it passes over said control marker irrespective of any emitted speed commands and essentially irrespective of the vehicle's type or whether it is moving in the automatic or manual mode and wherein a vehicle's trajectory computation data includes its length.

11. An automated road transportation system as set forth in claim 10 wherein the control marker means is adapted to determine separation distances between two successive vehicles passing over said marker means, and to emit two separate speed profile signals referred to as primary and secondary speed profile commands, said secondary speed commands also containing a time interval signal; and further comprising:

a vehicle passing over said marker means adapted to receive all information transmitted to it by said marker means including both primary and secondary speed commands;

means for storing said information in said vehicle's microprocessor;

said vehicle's speed control system and microprocessor means adapted to execute said primary or said secondary speed control commands depending on whether said time interval is or is not equal to zero, respectively;

said vehicle's speed control system, clock means and microprocessor further adapted to begin executing said primary speed control commands at the end of said time interval measured by said clock from the time said vehicle passes over said marker means if said time interval is not zero;

said primary speed control commands constituting a normal operating speed profile for that portion of said roadway immediately ahead of said marker means; and said secondary speed control commands constituting special collision-avoidance speed commands computed and generated inside said marker means by said microprocessor means triggered by the passage of a prior vehicle over said marker means at an earlier time with a dangerously close separation distance from said present vehicle.

12. An automated road transportation system as set forth in claim 11 wherein said vehicle sensing means in said control marker means are further adapted to prevent said speed control commands, transmitted from said marker means, from changing values when said vehicle is passing said marker so as to prevent garbled signal reception.

13. An automated road transportation system as set forth in claim 12 wherein said guiderail splits into two separate branches from a branch point with corresponding branching roadways further comprising a coded branching control marker means located some distance ahead of said branch point that identifies said branch point by emitting fixed coded branching information that is picked up by said control marker sensing means on said vehicle and processed in said vehicle's microprocessor, and branching means on-board said vehicle adapted to enable said vehicle to follow either branching roadway.

14. An automated road transportation system as set forth in claim 13 wherein said fixed coded branching information emitted by said branching marker means includes:

the identity of said branch point;

identification of each branching roadway; and two prescribed variable or fixed vehicle speed profile commands each of which is assigned to a particular branching roadway.

15. An automated road transportation system as set forth in claim 14 wherein said vehicle branching means comprises:

said control marker sensors;

said vehicle microprocessor;

said guiderail steering sensor means;

an electronic switching circuit means and means for establishing a constant reference guiderail sensing signal;

said guiderail reference signal substantially equal to the on-course signal received in said right hand guiderail sensing means if said vehicle is required to take the left hand branch while said reference signal is substantially equal to the on-course signal received in said left hand guiderail sensing means if said vehicle is required to take the right hand branch;

said electronic switching circuit means adapted to replace said steering signal received in said right hand guiderail sensing means by said constant right hand reference signal such that said vehicle will automatically follow said left hand branching guiderail and said electronic switching circuit further adapted to replace said steering signal received in said left hand guiderail sensing means by said constant left hand reference signal such that said vehicle will automatically follow said right hand branching guiderail; and said electronic switching circuit means adapted to replace said constant reference signals with said right hand or said left hand guiderail sensing signals as soon as the branching is completed.

16. An automated road transportation system as set forth in claim 15 further comprising:

data console means connected to said microprocessor whereby an occupant in said vehicle can program said microprocessor to execute specific route following instructions;

said microprocessor adapted to select one of two approaching branching roadways by comparing the identity of each branching roadway to said route following instructions received from said branching control marker means;

means to convey to said vehicle electronic switching circuit means the selected branching guiderail prescribed in said route following program;

said selection taking place after said vehicle passes said branching control marker means but before said vehicle reaches said branching point;

said microprocessor means further adapted to disregard said prescribed speed profile commands emitted by said branching control marker means that are associated with the branching roadway that said vehicle will not follow and adjust said vehicle's speed profile to match said prescribed speed profile associated with the branching roadway that said vehicle is programmed to follow; and said speed profile adjustment beginning after said vehicle passes said branching control marker means but before said vehicle reaches said branch point.

17. An automated road transportation system as set forth in claim 16 wherein said branching control marker means further sensor means mounted within said branching control marker means responsive to the passage of a vehicle moving over it;

a microprocessor mounted within said branching control marker means adapted to monitor and control said coded speed profile command signals associated with each branching roadway emitted by said branching control marker means;

a clock means within said branching control marker means that coacts in combination with said marker vehicle sensing means and said marker microprocessor means whereby the trajectory (including length) of a passing vehicle is computed and stored inside said marker microprocessor;

wiring means that connect said branching control microprocessor to a plurality of other microprocessors inside other branching or non-branching control marker means located in the vicinity of said branch point similarly adapted to sense and compute the trajectories of vehicles moving over them;

data transfer means adapted to transmit said trajectories to said microprocessor in said branching control marker means over said wiring means;

said microprocessor inside said branching control marker means adapted to use said incoming trajectory data to generate a traffic trajectory ephemeris corresponding to a plurality of vehicles moving in the vicinity of said branch point; and said microprocessor inside said branching control marker means adapted to use said traffic trajectory ephemeris to compute collision avoidance speed profile commands that are transmitted by said branching marker means such that a vehicle passing over said branching control marker means will receive speed profile commands that will, upon execution of said vehicle, allow said vehicle to proceed onto either branch without colliding with other vehicles.

18. An automated road transportation system as set forth in claim 17 further comprising:

a central traffic control computer;

wiring means that connect said central traffic control computer to said microprocessor inside said marker means distributed along said roadways;

data transfer means adapted to transmit data between said microprocessors and said central traffic control computer;

said traffic control computer adapted to use said incoming trajectory data to construct and monitor the flow pattern of all vehicles passing over said guiderail equipped roadways;

said central traffic control computer using said flow pattern to determine efficient speed profiles for said marker means so that substantially all vehicular traffic moving on said roadways will move more efficiently;

said traffic control computer adapted to transmit said calculated speed profiles to said microprocessors inside said marker means using said data transfer means;

said marker means adapted to transmit said efficient speed profile commands to passing vehicles; and said central traffic control computer adapted to substantially maintain said traffic flow moving with said calculated efficient speed profiles.

19. An automated road transportation system as set forth in claim 18 further comprising:

a master clock means located at said remote central traffic control computer adapted to transmit timing signals to said marker means and branching marker means via said wiring means; and said timing signals adapted to synchronize said clock means inside each marker means with said master clock means so that all said clock means give same exact time.

20. An automated road transportation system as set forth in claim 19 wherein said efficient speed profile commands calculated by said central traffic control computer are emitted by said marker means as said primary speed profile commands.

21. An automated road transportation system as set forth in claim 20 wherein said emergency operating mode switching means includes:

a steering wheel means whereby an occupant inside said vehicle can steer said vehicle when said vehicle is operating in said manual mode; and a torque sensing means connected to said steering wheel means adapted to switch said operating mode from automatic to manual after sensing a sufficiently high torque on said steering wheel.

22. An automated road transportation system as set forth in claim 20 wherein said vehicle further comprises:

an automatic/manual operating mode switching means adapted to allow an occupant to begin a trip in the manual operating mode if said vehicle were not parked over any guiderail means and drive manually to a guiderail equipped roadway where the trip can be continued in the automatic mode by said occupant switching said switching means to the automatic driving mode; and said automatic/manual switching means adapted to allow said occupant to take over manual control of said vehicle to complete said trip and park said vehicle if no guiderail equipped roadway were provided at said destination.

23. An automated road transportation system as set forth in claim 22 further comprising:

a vehicle moving over said marker means;

said vehicle having a characteristic magnetic moment;

magnetometer sensing means mounted within said marker means adapted to emit characteristic signals in response to said vehicle's characteristic magnetic moment;

electronic amplification and signal processing means adapted to transmit said characteristic magnetic moment signals to said central traffic control computer; and said computer adapted to utilize said characteristic magnetic moment data to identify each individual vehicle moving over said marker means substantially according to size or type so that said trajectory data (that also includes length) transmitted from said marker means to said traffic control computer also includes vehicle type or size information so that each individual vehicle making up said traffic flow can be further particularized into individual length and type or size whereby said computer can determine a more detailed traffic flow and compute and maintain more efficient speed profiles by said control means.

24. An automated road transportation system as set forth in claim 23 further comprising:

a portion of non-guiderail equipped roadways;

conventional traffic light signals on said portion for controlling traffic flow over said roadways;

vehicles moving along said roadways under conventional manual control;

sensor means embedded along said roadways responsive to the passage of said vehicles;

wiring means that connect said sensor means to said central traffic control computer;

said sensor means adapted to transmit signals to said computer in response to vehicles moving over them so that said computer can calculate a traffic flow pattern for vehicles moving over said non-guiderail equipped roadways;

wiring means that electronically connect said conventional traffic light signals to said computer whereby said computer and said traffic lights are adapted to enable said traffic lights to be controlled by said computer; and said computer adapted to transmit optimal traffic control commands to said traffic lights so as to enable said vehicles to move in an efficient manner over said non-guiderail equipped roadways so as to be efficiently integrated into said automated vehicular traffic moving over said guiderail equipped roadways.

25. An automated road transportation system as set forth in claim 24 further comprising:

guiderail equipped roadways with marker means for automated vehicular travel;

electronically operated, visual speed signs installed at intervals near a portion of said marker means along said automated roadways for the drivers of non-automated, manually operated vehicles;

wiring means that connect said visual speed signs to said nearby marker means and adapted so that said primary speed commands emitted by said marker means also appear visually on said electronic road signs;

additional visual road signs installed just before branching roadways so that said branching roadways can be identified by drivers of mannually operated vehicles;

said guiderails and branching guiderails over all automated roadways painted with a bright color strip that contrasts with said roadway so as to be easily seen and followed by the drivers of non-automated manually operated vehicles; and said automated road transportation system adapted to allow any number of automatically controlled vehicles to mix with any number of manually controlled vehicles in any order moving over any portion of automated roadways by prohibiting the drivers of manually operated vehicles from making lane changes or branches over portions of roadway that are not provided with clearly painted lane changing or branching guiderails and requiring said drivers to obey said posted speed signs with reasonable accuracy wherever possible.

26. An automated road transportation system as set forth in claim 25 wherein said vehicle further comprises:

active sensing means responsive to the proximity of other vehicles or other objects on said roadway;

said active sensor means adapted to generate signals in response to the proximity of other said vehicles or objects for transmission into said microprocessor on-board said vehicle for processing;

said microprocessor inside said vehicle adapted to analyze said response signals to determine if said vehicle's present speed profile being executed in said microprocessor requires modification to prevent a collision with other said vehicles or objects;

said microprocessor adapted to compute and execute a modified speed profile for said vehicle to prevent a possible collision irrespective of any speed profile commands received from any marker means; and said microprocessor further adapted to terminate said modified speed profile and resume executing normal speed profile commands received from the last marker means as soon as the possibility for collision is over.

27. An automated road transportation system as set forth in claim 26 wherein said vehicle further comprising:

a mass data storage system connected electronically to said on-board microprocessor means whereby said route instructions (or route programs) can be taken out of said microprocessor and stored in said mass data storage system for future use inside said microprocessor;

said route programs accumulated and stored in said mass data storage system under certain access codes whereby any particular stored route program can be identified and transferred into said microprocessor for execution by manual operation of said microprocessor's control console;

roadway data files that includes the identity of all guiderail equipped roadways and branches within various regions adapted for storage in said mass data storage system; and said microprocessor further adapted to automatically access and pull into its operating memory an appropriate roadway data file corresponding to any selected route program that covers all roadways used to execute said route program.

28. An automated road transportation system as set forth in claim 27 wherein said vehicle further comprises:

data input means for said vehicle's microprocessor whereby an occupant can input said vehicle's present position and desired destination;

a mobile radiotelephone communications system adapted for establishing a telephone data transfer link between said microprocessor in said vehicle and said remote central traffic control computer;

said central traffic control computer adapted to receive said beginning and ending points via said radiotelephone data transfer link and compute detailed route following instructions relative to existing traffic flow that said computer is monitoring which upon execution, will allow said vehicle to execute said trip with reduced travel time and reduced fuel expenditure;

said vehicle microprocessor adapted to receive said route following instructions via said radiotelephone data link;

said route following instructions also containing total distance of said route and estimated travel time;

said microprocessor also adapted to automatically access an appropriate roadway data file from said mass data storage system that covers all roadways followed by said route instructions and pull it into its operating memory with said route instructions; and said vehicle equipped with a manual execution control such that, when activated, said vehicle proceeds to execute said route following instructions provided said vehicle is parked in an appropriate position over a section of clear guiderail.

29. An automated road transportation system as set forth in claim 28 wherein said data input means to said vehicle microprocessor is further adapted to receive and transmit, in addition to said beginning and end points, additional constraining conditions that are to be satisfied by any route program calculated by said remote central traffic control computer, said remote traffic control computer adapted to compute a new optimal route program that will incorporate said additional constraining conditions so as to still provide reduced travel time with reduced fuel expenditure, said data transfer link adapted to transmit said conditional optimal route program to said vehicle microprocessor for execution.

30. An automated road transportation system as set forth in claim 29 wherein said vehicle includes
on-board fuel load sensing means;
oil sensing means;
brake fluid sensing means;
transmission fluid sensing means;
radiator fluid sensing means;
windshield wiper fluid sensing means;
tire air pressure sensing means;
engine performance sensing means;
electrical systems sensing means;
engine temperature sensing means;
battery sensing means;
fuel cap on/off sensing means;
microprocessor video monitor screen;
whereby above identified sensing means connected electronically to said microprocessor such that before any trip is initiated, the status of above identified vehicle components is displayed on said video monitor for viewing by an occupant;
said microprocessor and video monitor further adapted to compute and display the total fuel required to execute a given route program inside said microprocessor; and
inhibitor on/off selector means adapted so that when said inhibitor is turned on, said vehicle is prevented from operating in the automatic mode with a route program that cannot be completed without said vehicle exhausting its on-board fuel supply.

31. An automated road transportation system as set forth in claim 30 wherein said vehicle further comprises:
a video monitor connected to said proximity warning system adapted to enable said occupant to view or monitor any vehicular traffic moving in the vicinity of said vehicle or said roadway ahead or behind said vehicle;
telephone communication means connected to said vehicle's mobile radiotelephone system to enable said occupant to place ordinary telephone calls while traveling inside said vehicle; and
a television receiver mounted inside said vehicle to enable said occupant to view television programs while traveling inside said vehicle.

32. An automated road transportation system as set forth in claim 31 further comprising:
a refueling station;
a guiderail equipped roadway leading into and out of said refueling station;
branching marker means adapted to allow vehicles to automatically enter, stop, refuel and leave said refueling station;
an attendant at said refueling station;
a fuel inlet conduit on a vehicle in said station;
a fuel cap cover on said fuel inlet conduit;
sensor means connected to said cap adapted to send signals to said vehicle's microprocessor when said cap is removed and when said cap is replaced;
a fuel tank on said vehicle connected to said fuel inlet conduit;
fuel sensing means responsive to the quantity of fuel in said fuel tank adapted to send on-board fuel quantity signals to said microprocessor;
said microprocessor adapted to monitor the removal of said fuel cap, the amount of fuel coming into said fuel tank and the replacement of said fuel cap;
said microprocessor further adapted to allow said vehicle to leave said station by said exit guiderail equipped roadway after a certain time interval after said attendant replaces said cap;
said refueling operation taking place without any assistance from any occupant inside said vehicle; and
said roadway data files also containing the locations of all guiderail equipped refueling stations in the area covered by any data file whereby said microprocessor is further adapted to utilize this additional information to direct said vehicle to automatically enter a guiderail equipped refueling station along the route being followed or at a nearby station, so that its on-board fuel supply can be replenished before being exhausted, and automatically direct said vehicle to leave said station and resume executing its route program without any assistance from any occupant that may be inside said vehicle.

33. An automated road transportation system as set forth in claim 32 including an automated parking lot comprising:
parking stall means;
guiderails embedded along said stalls and in said parking lot;
a guiderail equipped roadway passing said parking lot;

an entering guiderail equipped roadway section branching away from said roadway passing said parking lot, that leads into said parking lot and connected to said guiderails in said parking stalls;

an exiting guiderail equipped roadway section connected to said guiderail equipped parking stalls that leads out of said parking lot and branches into and connects onto a guiderail equipped roadway passing said parking lot;

branching marker means embedded into said roadway some distance before said branching section leading into said parking lot adapted to emit signals to passing vehicles that identifies said parking lot and branching speed commands so as to allow vehicles to enter said lot without collision;

control marker means inside said parking lot adapted to allow vehicles to move along said guiderails without collision;

sensor means inside said parking stalls responsive to the presence of parked vehicles in said stalls;

wiring means inside said parking lot connecting said sensor means electronically to control marker means that is adapted to identify vacant parking stalls by signals received from said sensor means;

said control marker means adapted to emit signals to a passing vehicle that identifies a vacant parking stall;

sensor means on-board said vehicle adapted to pick up said vacant stall signals and transmit them to said microprocessor;

said microprocessor adapted to process said signals and direct said vehicle to automatically park in said vacant parking stall without any assistance from any occupant or parking attendant;

additional marker means adapted to allow any number of vehicles to automatically leave their respective parking stalls and exit said parking lot via said exiting guiderail equipped roadway section without collision and without the assistance of any occupants; and a portion of said control marker means adapted to count the total number of vacant parking stalls inside said parking lot and further adapted to transmit an appropriate "lot full" signal to said branching control marker means outside of said parking lot to prevent further vehicles from entering into said parking lot before any other parked vehicle leaves.

34. An automated road transportation system as set forth in claim 33 further comprising:
a garage door;
an automatic garage door opener means on said garage door adapted to open said door in response to transmitted radio signals;
a vehicle parked in said garage in a guiderail equipped parking stall;
said vehicle equipped with radio transmitter means adapted to open said garage door in response to commands generated in said vehicle's microprocessor whereby said vehicle can automatically leave said parking stall, open said garage door, leave said garage, execute an automated journey, return to said garage, open said door and park in said parking stall without the assistance of any occupant.

35. An automated road transportation system as set forth in claim 34 further comprising:
receiving means connected to said vehicle's mobile radiotelephone communication system adapted to allow said vehicle to be "called up" at any time from an ordinary telephone at a remote location so as to establish a telephone data transfer link with said microprocessor on-board said vehicle;

portable data transfer means adapted for accessing said vehicle's microprocessor from an ordinary remote telephone whereby data, information or route commands can be entered into said microprocessor for automatic execution as though said commands were inserted into said microprocessor from said control console inside said vehicle;

said commands including a go to a certain location command (automatic rendezvous command) transmitted from said remote telephone such that when received by said microprocessor, said microprocessor automatically establishes a radiotelephone data transfer link to said traffic control computer, transmits present position and destination data to said computer, wherein said computer calculates optimal route instructions relative to existing traffic flow and transmits these optimal route instructions to said microprocessor along with total distance and total travel time, whereupon said microprocessor uses said distance and travel time data to compute an estimated time of arrival (automatically taking into consideration whether or not the vehicle will have to stop for additional fuel before the rendezvous is made) and this estimated time of arrival transmitted by said microprocessor to said remote telephone data transfer means where it is received and acknowledged by said person at said remote telephone whereupon said vehicle automatically departs on an automated voyage to the selected rendezvous point to pick up said person without any human occupant inside said vehicle; and said commands including sending said vehicle on any other automated voyage to pick up a different person at a different location, or to pick up a recently purchased object at a certain store; or to go to another home across the state or country for operation in some other city, or to go to a certain local repair facility for repairs, or the like, without any occupant inside said vehicle.

36. An automatic guidance system for passenger carrying road vehicles comprising:
a roadway;
a passive metallic guiderail embedded longitudinally along said roadway;
a vehicle on the roadway;
means on the vehicle for transmitting a signal from the vehicle toward the guiderail;
sensor means mounted on said vehicle responsive to a return signal from said guiderail for emitting a steering signal in response to the return signal;
control means in said vehicle for continuously steering said vehicle in response to said steering signal from said sensor means so as to maintain said vehicle in a predetermined lateral position with respect to said guiderail as said vehicle moves along said roadway;
a plurality of control marker means for conveying coded information signals to said vehicle embedded along said roadway adjacent to said guiderail and spaced apart at various positions and wherein said coded information signals emitted from said roadway control marker means include roadway identification, position and a prescribed primary vehicle speed profile;

sensor means mounted on said vehicle responsive to said coded information signals received from said control marker means for controlling said vehicle; and wherein said control marker means comprises a left marker means and a right marker means embedded on each side of said guiderail means and adapted to emit identical signals and wherein said onboard control marker sensor means comprises a left sensor means responsive to said left marker means and a right sensor means responsive to said right marker means; and further comprising a comparator means for comparing the control marker signals received by each sensor to ensure that they are identical before executing control of said vehicle in response to such signals.

37. An automatic guidance system for passenger carrying road vehicles comprising:

a roadway;

a passive metallic guiderail embedded longitudinally along said roadway;

a vehicle on the roadway;

means on the vehicle for transmitting a signal from the vehicle toward the guiderail;

sensor means mounted on said vehicle responsive to a return signal from said guiderail for emitting a steering signal in response to the return signal;

control means in said vehicle for continuously steering said vehicle in response to said steering signal from said sensor means so as to maintain said vehicle in a predetermined lateral position with respect to said guiderail as said vehicle moves along said roadway;

a plurality of control marker means for conveying coded information signals to said vehicle; and sensor means mounted on said vehicle responsive to said coded information signals received from said control marker means for controlling said vehicle; and wherein such a control marker means is a passive transponder adapted to transmit the same signal to each passing vehicle comprising:

a plurality of metallic elements having a selected size and shape and arranged in a selected geometric arrangement so that when stimulated by an external field emanating from a passing vehicle the metallic elements generate a distinctive reaction field representing a coded control signal.

38. An automatic guidance system for passenger carrying road vehicles comprising:

a roadway;

guide means extending longitudinally along said roadway;

a vehicle on the roadway;

means on the vehicle for sensing and following such guide means;

a plurality of control marker means along said roadway for conveying coded control signals to said vehicle;

means on the vehicle responsive to said coded control signals for controlling said vehicle; and wherein each such control marker means comprises a pair of marker means adjacent such guide means, each of such a pair of marker means being adapted to emit identical signals and further comprising:

means on said vehicle for sensing signals from each of such a pair of marker means and comparator means for comparing such signals to insure that they are identical for avoiding spurious control signals.

39. A system as recited in claim 38 wherein each such control marker means comprises a passive transponder adapted to transmit the same signal to each passing vehicle comprising:

a plurality of metal elements having a selected size and shape embedded in the roadway in a selected geometric arrangement so that when stimulated by an external field emanating from a passing vehicle, the metallic elements generate a distinctive reaction field representing a coded control signal.

40. An automatic guidance system for a self-propelled passenger carrying, ground transportation vehicle comprising:

a roadway;

a metallic guiderail embedded longitudinally along said roadway;

a vehicle on said roadway;

sensor means mounted on said vehicle responsive to said guiderail for emitting a steering signal upon detecting the proximity of said guiderail; and control means inside said vehicle adapted to continuously steer said vehicle is response to said steering signal from said sensor means so as to maintain said vehicle in a predetermined lateral position with respect to said guiderail as said vehicle moves along said roadway;

a plurality of control marker means embedded at spaced apart intervals along said roadway adjacent to said guiderail for conveying coded speed control signals to said vehicle; and means mounted on board said vehicle responsive to said control signals for controlling speed of said vehicle; and wherein such a control marker means is a passive transponder adapted to transmit the same control signals to each passing vehicle comprising:

a plurality of metallic elements having a selected size and shape and arranged in a selected geometric order relative to each other such that when stimulated by an external field emanating from a passing vehicle the metallic elements generate a distinctive reaction field representing said coded control signals.

41. An automatic guidance system for a self-propelled passenger carrying, ground transportation vehicle comprising:

a roadway;

a metallic guiderail embedded longitudinally along said roadway;

a vehicle on said roadway;

sensor means mounted on said vehicle responsive to said guiderail for emitting a steering signal upon detecting the proximity of said guiderail; and control means inside said vehicle adapted to continuously steer said vehicle in response to said steering signal from said sensor means so as to maintain said vehicle in a predetermined lateral position with respect to said guiderail as said vehicle moves along said roadway;

a plurality of control marker means along such roadway for conveying coded control signals to said vehicle;

control marker sensor means mounted on board said vehicle responsive to said control signals; and wherein said control marker means comprises a left marker means and a right marker means embedded on each side of said guiderail means and adapted to emit identical signals, and wherein said on board control marker sensor means comprises a left sensor means responsive to said left marker means and a right sensor means responsive to said right marker means; and further comprising a comparator means for comparing the control marker signals received by each sensor means to ensure that they are identical for avoiding spurious signals.

42. An automatic guidance system as set forth in claim 41 further comprising an automatic speed control means for controlling the speed of said vehicle according to speed control commands received from said control marker means.

43. An automatic guidance and control system for ground transportation vehicles as set forth in claim 41 wherein said roadway splits into two separate branching roadways with corresponding guiderails branching away from a branch point and further comprising a marker means located some distance ahead of said branch point that identifies said branch point by emitting coded branching information that is received by said control marker sensor means on board said vehicle.

44. An automatic road transportation system as set forth in claim 43 further comprising automatic switching means that enables said vehicle to automatically follow either branching roadway.

45. An automatic guidance system for road vehicles as set forth in claim 41 wherein said guiderail sensor means mounted on said vehicle comprises a central sensor means and flanking left and right sensor means mounted to the left and to the right of said control sensor means that are responsive to said guiderail and wherein said steering control means is adapted to maintain said vehicle on a course wherein said central sensor means always remains substantially directly over the embedded guiderail.

46. An automatic guidance system as set forth in claim 45 further comprising redundant steering control means whereby said vehicle can continue following said guiderail if any one or any two of said center, left and right guiderail sensor means malfunctions.

47. A method for automatically guiding a vehicle along a roadway including guide means extending longitudinally along said roadway comprising the steps of:
emitting a signal from the vehicle towards such guide means;
detecting a return signal from said guide means;
coupling said return signal to control means for continuously steering the vehicle in response to said return signal for maintaining said vehicle in a predetermined lateral position with respect to said guide means;
uniquely identifying each of two branching roadways by branching control marker means located on such roadway spaced apart from the branching roadways for emitting fixed coded branching information, each of said branching roadways including guide means extending longitudinally along such branching roadway;
sensing coded branching information from such branching control marker means;
directing said vehicle along a selected guide means on a branching roadway in response to the sensed coded branching information;
emitting a prescribed vehicle speed profile from control marker means on the roadway adjacent the guide means;
adjusting the vehicle's actual speed profile to match the prescribed speed profile associated with an adjacent control marker means;
sensing the passage and trajectory of a vehicle passing such a branching control marker means;
sensing the presence and trajectory of any other vehicles passing over a plurality of adjacent control marker means;
generating a traffic trajectory ephemeris corresponding to any vehicles moving in the vicinity of such branching roadways; and
using said traffic trajectory ephemeris for computing collision-avoidance speed profile commands emitted by said branching control marker means so that the vehicle passing over said branching control marker means receives speed profile commands for allowing said vehicle to proceed onto the selected branch without colliding with other vehicles.

48. A method as recited in claim 47 further comprising:
emitting separate prescribed speed profiles for each branching roadway; and
selecting a prescribed speed profile adjacent such branching control marker means for adjusting said vehicle's actual speed profile to match a selected prescribed speed profile associated with the branching roadway said vehicle is programmed to follow.

49. An automatic guidance system for passenger carrying road vehicles comprising:
a roadway;
a passive metallic guiderail embedded longitudinally along said roadway;
a vehicle on the roadway;
means on the vehicle for transmitting a signal from the vehicle toward the guiderail;
sensor means mounted on said vehicle responsive to a return signal from said guiderail for emitting a steering signal in response to the return signal, wherein the mass per unit length of the guiderail is sufficiently larger than reinforcement rods in such roadway for supressing distortions of such return signal by such reinforcement rods; and
control means in said vehicle for steering said vehicle in response to said steering signal from said sensor means so as to maintain said vehicle in a predetermined lateral position with respect to said guiderail as said vehicle moves along said roadway.

* * * * *

UNITED STATES PATENT AND TRADEMARK OFFICE
CERTIFICATE OF CORRECTION

PATENT NO. : 4,361,202

DATED : November 30, 1982

INVENTOR(S) : Michael A. Minovitch

It is certified that error appears in the above-identified patent and that said Letters Patent is hereby corrected as shown below:

Column 3, line 58, "allowed" should be -- followed --.
Column 15, line 21, "designs" should be -- design --.
Column 25, line 50, "will route" should be -- with route --.
Column 32, line 9, the equation should be $$W = \int m\,dl = \int_{t_{11}}^{t_{12}} m_1(t)\,v\,dt = \int_{t_{21}}^{t_{22}} m_2(t)\,v\,dt$$

Column 32, line 15, the equation should be $$W = 1/2 \left\{ \int_{t_{11}}^{t_{11}} m_1(t)\,v\,dt + \int_{t_{21}}^{t_{22}} m_2(t)\,v\,dt \right\}$$

Column 42, line 44, "large" should be -- lane --.
Column 46, line 24, "L - R(or L' - R')" should be -- $L_o$ - R(or $L_o'$ - R') --

Column 46, line 40, "(or L' = $R_o'$)" should be -- (or L' - $R_o'$) --
Column 51, line 3, "covex" should be -- convex --.
Column 57, line 24, "further" should be -- further comprises --.
Column 66, line 27, "is" should be -- in --.

Signed and Sealed this

Sixteenth Day of August 1983

[SEAL]

Attest:

GERALD J. MOSSINGHOFF

Attesting Officer     Commissioner of Patents and Trademarks